US012611659B2

(12) United States Patent
Verboekend et al.

(10) Patent No.: US 12,611,659 B2
(45) Date of Patent: Apr. 28, 2026

(54) MESOPOROUS ZEOLITES AND USES THEREOF IN DEWAXING HYDROCARBON FEEDS

(71) Applicant: ZEOPORE TECHNOLOGIES NV, Leuven (BE)

(72) Inventors: Danny Verboekend, Leuven (BE); Martin D'Halluin, Leuven (BE)

(73) Assignee: ZEOPORE TECHNOLOGIES NV, Leuven (BE)

( * ) Notice: Subject to any disclaimer, the term of this patent is extended or adjusted under 35 U.S.C. 154(b) by 254 days.

(21) Appl. No.: 18/567,120

(22) PCT Filed: Jun. 7, 2022

(86) PCT No.: PCT/EP2022/065420
§ 371 (c)(1),
(2) Date: Dec. 5, 2023

(87) PCT Pub. No.: WO2022/258627
PCT Pub. Date: Dec. 15, 2022

(65) Prior Publication Data
US 2025/0345781 A1     Nov. 13, 2025

(30) Foreign Application Priority Data

Jun. 7, 2021     (NL) ..................................... 2028402

(51) Int. Cl.
B01J 37/08          (2006.01)
B01J 29/74          (2006.01)
          (Continued)

(52) U.S. Cl.
CPC ......... B01J 29/7492 (2013.01); B01J 35/615 (2024.01); B01J 35/633 (2024.01);
          (Continued)

(58) Field of Classification Search
CPC .... B01J 29/7492; B01J 35/615; B01J 35/633; B01J 35/635; B01J 35/638; B01J 37/08;
          (Continued)

(56) References Cited

U.S. PATENT DOCUMENTS

| | | |
|---|---|---|
| 2005/0130833 A1 | 6/2005 | Benazzi |
| 2007/0029230 A1 | 2/2007 | Maesen |

FOREIGN PATENT DOCUMENTS

| | | | | |
|---|---|---|---|---|
| EP | 2554259 A1 | 2/2013 | | |
| EP | 2554259 B1 * | 9/2018 | .......... | C10G 65/043 |

(Continued)

OTHER PUBLICATIONS

Martens, Johan A., et al. "Hydroisomerization and hydrocracking of linear and multibranched long model alkanes on hierarchical Pt/ZSM-22 zeolite." Catalysis today 218 (2013): 135-142.

(Continued)

*Primary Examiner* — Ellen M Mcavoy
*Assistant Examiner* — Chantel Graham
(74) *Attorney, Agent, or Firm* — NIXON PEABODY LLP; Ronald I. Eisenstein; Nicole D. Kling

(57) ABSTRACT

The present invention relates to the field of dewaxing of hydrocarbon feeds. More in particular, it relates to the use of alkaline-treated mesoporous zeolites and catalysts encompassing the same for the dewaxing of hydrocarbon feeds. It was found that the zeolites and catalysts of the present invention can significantly reduce cracking of the hydrocarbon feed, and accordingly significantly reduce liquid hydrocarbon feed loss during processes such as dewaxing.

17 Claims, 7 Drawing Sheets

Figure 1:
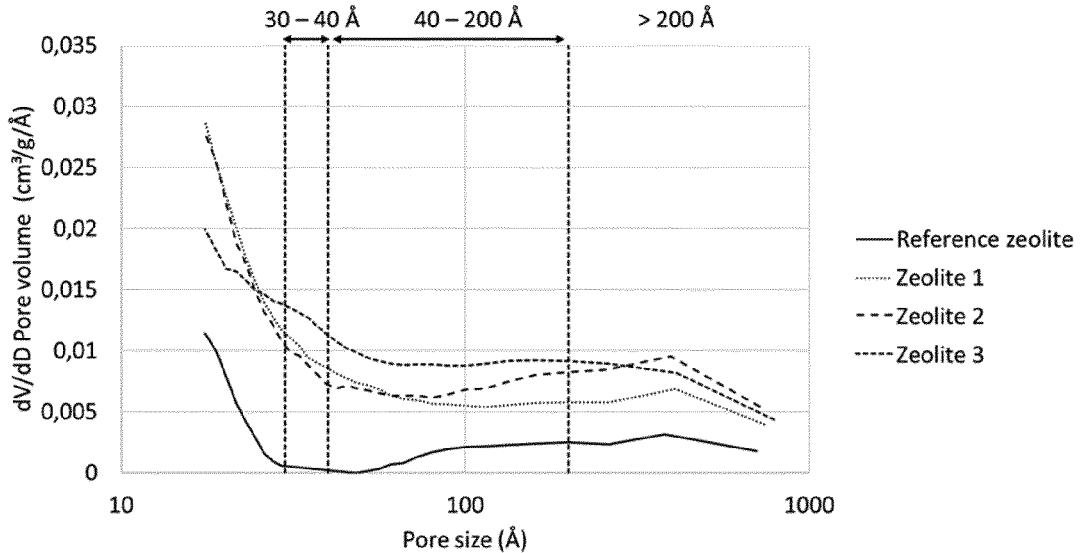

(51) Int. Cl.

| | |
|---|---|
| *B01J 35/61* | (2024.01) |
| *B01J 35/63* | (2024.01) |
| *B01J 37/30* | (2006.01) |
| *C01B 39/02* | (2006.01) |
| *C10G 21/00* | (2006.01) |

(52) U.S. Cl.
CPC ........... *B01J 35/635* (2024.01); *B01J 35/638* (2024.01); *B01J 37/08* (2013.01); *B01J 37/30* (2013.01); *C01B 39/026* (2013.01); *C10G 21/00* (2013.01); *B01J 2229/37* (2013.01); *B01J 2229/38* (2013.01)

(58) Field of Classification Search
CPC .... B01J 37/30; B01J 2229/37; B01J 2229/38; C01B 39/026; C10G 21/00
See application file for complete search history.

(56) References Cited

FOREIGN PATENT DOCUMENTS

| WO | 2015100171 A1 | 7/2015 |
|---|---|---|
| WO | 2017148852 A1 | 9/2017 |
| WO | 2019025428 A1 | 2/2019 |
| WO | 2021130303 A1 | 7/2021 |

OTHER PUBLICATIONS

Emeis. "Determination of integrated molar extinction coefficients for infrared absorption bands of pyridine adsorbed on solid acid catalysts" Journal of catalysis 141.2: 347-354 (1993).

Groen et al. "Mesoporosity development in ZSM-5 zeolite upon optimized desilication conditions in alkaline medium." Colloids and Surfaces A: Physicochemical and Engineering Aspects 241.1-3: 53-58 (2004).

Sree et al. "Hydroisomerization and hydrocracking activity enhancement of a hierarchical ZSM-5 zeolite catalyst via atomic layer deposition of aluminium" Catalysis Science & Technology 6.16: 6177-6186 (2016).

Verboekend et al. "Mesoporous ZSM-22 zeolite obtained by desilication: peculiarities associated with crystal morphology and aluminium distribution." CrystEngComm 13.10: 3408-3416 (2011).

* cited by examiner

Reference catalyst

Catalyst 1

■ P : Paraffins (linear alkanes)
◪ I : Isomers (branched alkanes)
▦ A : Aromatics
▦ N : Naphthenes
▨ O : Olefins Catalyst 2

Catalyst 3

■ P : Paraffins (linear alkanes)
☒ I : Isomers (branched alkanes)
▨ A : Aromatics
⊡ N : Naphthenes
▨ O : Olefins

MESOPOROUS ZEOLITES AND USES THEREOF IN DEWAXING HYDROCARBON FEEDS

CROSS-REFERENCE TO RELATED APPLICATIONS

This application is a 35 U.S.C. § 371 National Phase Entry Application of International Application No. PCT/EP2022/065420 filed Jun. 7, 2022, which designates the U.S. and claims benefit under 35 U.S.C. § 119(a) of NL Application No. 2028402 filed Jun. 7, 2021, the contents of which are incorporated herein by reference in their entireties.

FIELD OF THE INVENTION

The present invention relates to the field of dewaxing of hydrocarbon feeds. More in particular, it relates to the use of mesoporous zeolites and catalysts encompassing the same for the dewaxing of hydrocarbon feeds.

BACKGROUND TO THE INVENTION

Many fuels (hydrocarbons) such as diesel have a tendency to solidify, i.e. become waxy at low temperatures (e.g. −10° C. to 0° C.) which inhibits practical use in winter for many regions in the world. This tendency to become 'waxy' can be determined by various methods, such as the point where the diesel starts to form clouds of solid crystals, i.e. the cloud point (CP).

Catalytic dewaxing is a solution to this problem and a preferred refining option to lower the temperature of the CP (by branching of the heaviest linear paraffins) to ca. −35° C. However, a significant disadvantage of catalytic dewaxing, it that also significant cracking occurs thereby leading to costly diesel being lost during said process in favor of light gases being formed. Besides the obvious benefit of a higher diesel retention, a more selective dewaxing process is also desirable as the resulting lower gas formation positively influences the overall capacity of the dewaxing unit.

Mesoporous zeolites are widely known to increase isomerization and reduce cracking as predominately shown on model compounds, such as linear paraffins. However, the value of mesoporous zeolites has never clearly been demonstrated on a real diesel feed, being much more complex compared to simple linear paraffins used as model compounds. Therefore, it was an object of the present invention to find a solution for the dewaxing at a reduced degree of cracking, which is suitable for use on real industrial feedstocks, such as diesels and lube oils.

Thereto, the present invention provides specific mesoporous zeolites having particular value in the field of dewaxing, by significantly reducing cracking of the hydrocarbon feed, and accordingly significantly reducing liquid hydrocarbon feed loss during dewaxing.

EP2554259 describes the synthesis and use of zeolite-based hydroisomerization catalysts modified with metals from the group of Na, K, Cs, Mg, Ca, and Ba. Said teachings differ on many accounts from the present invention based on, for example, the need to execute the metal-modification on an organic-containing zeolite which has not been exposed to temperatures beyond 450° C. The current invention is very effective for zeolites with organic template and also for those from which the template has been removed, as well as those heat-treated beyond 450° C. The aspect of mesoporosity and the need for a controlled pH, being key to the current invention, are not mentioned in EP2554259. Other distinct differences are the method to execute the metal modification, being ion exchange in EP2554259 and not precipitation, such as disclosed herein. Another difference relates to the types of suitable metals, especially univalent metals such as Na, Cs, and K. The latter are explicitly not within the scope of the current invention. Next, the metal-to-zeolite range at any stage in the metal modification is relatively low (yielding a molar metal/Al ratio of ca. 0.05 in EP2554259), whereas the current invention features a much wider range of molar metal-to-alumina (or metal-to-zeolite) ratios, often resulting in molar metal/Al ratios beyond 1. Also, in EP2554259 the metal modification is a last step in a range of modifications to the zeolite, and is only followed by catalyst making and noble metal impregnation steps. The current application employs systematically further zeolite modifications steps in the form of subsequent ion exchange and/or an acid treatments. These differences make that the teachings in EP2554259 do not enhance hydro-isomerization performance by increased diesel or lube retention at fixed cloud or pour point improvement as disclosed herein.

SUMMARY OF THE INVENTION

Accordingly, in a first aspect, the present invention provides a method for dewaxing a hydrocarbon feedstock, said method comprising the steps of:

providing a hydrocarbon feedstock to a reactor;

providing a catalyst to the reactor; and contacting the hydrocarbon feedstock with the catalyst, wherein the catalyst comprises at least 300 ppm of a hydrogenation metal and an alkaline-treated mesoporous zeolite, wherein the alkaline treated mesoporous zeolite comprises a framework density ($FD_{Si}$) of 17 to 20 T/nm$^3$, a molar Si/Al ratio of 20 to 400, and a mesopore volume of 0.05 to 1.2 ml/g, and wherein the alkaline-treated mesoporous zeolite is prepared by an alkaline treatment comprising the steps of:

providing a parent zeolite to an aqueous solution, wherein the aqueous solution has a pH of at most 8, and comprises at least one salt comprising an element selected from the group of Mg, Ca, Ti, V, Cr, Ni, Co, Fe, Cu, Mn, La, Ce, W, Mo;

adding a base to the reaction mixture, wherein the pH of the aqueous reaction mixture is increased to at least 10;

reacting the base and the parent zeolite thereby obtaining said alkaline-treated mesoporous zeolite; and separating the alkaline-treated mesoporous zeolite.

It is noted that throughout this application the parent zeolite refers to the zeolite before alkaline-treatment. In other words, said parent zeolite is an untreated zeolite, and may be a mesoporous parent zeolite.

Furthermore, it is noted that throughout this application an alkaline-treated mesoporous zeolite refers to a zeolite which has ben treated by an alkaline. Thus, in other words, the alkaline-treated mesoporous zeolite is obtained by alkaline treatment of the (mesoporous) parent zeolite.

In a particular embodiment, the present invention provides a method as defined herein further comprising that the alkaline-treated mesoporous zeolite features a magnesium content in the range of 0.3 wt % to 10 wt %. Preferably, the magnesium content is at least 50% as measured with oxalic acid chemisorption.

In a particular embodiment, the present invention provides a method as defined herein further comprising that the alkaline-treated mesoporous zeolite features a mesopore volume of 0.05 to 0.4 ml/g.

In a particular embodiment, the present invention provides a method as defined herein further comprising that the alkaline-treated mesoporous zeolite features a mesopore volume of 0.4 to 1.2 ml/g.

In a particular embodiment, the present invention provides a method as defined herein wherein the alkaline treatment further comprises performing a subsequent acid treatment.

In a particular embodiment, the present invention provides a method as defined herein wherein the hydrocarbon feedstock is selected from the group comprising wax, hydrowax, diesel, lube oil, base oil, vegetable oil, Fischer-Tropsch derived oil or any combination thereof.

In a particular embodiment, the present invention provides a method as defined herein wherein the cloud point of the hydrocarbon feedstock after the step of contacting is reduced by at least 10° C., and wherein the hydrocarbon feedstock before the step of contacting has a cloud point over −10° C. and a pour point over −15° C.

In a particular embodiment, the present invention provides a method as defined herein wherein the method reduces diesel losses to less than 0.2% per degree Celsius of Cloud Point improvement.

In a particular embodiment, the present invention provides a method as defined herein wherein the dewaxing conditions comprise a temperature in the range of 200° C. to 450° C., preferably a temperature in the range of 250° C. to 400° C. Preferably the temperature may be in the range of 200° C. to 350° C. or the temperature is about 260° C., 270° C., 280° C., 290° C., 300° C., 310° C., 320° C., 330° C., 340° C. It is noted that said temperatures may be upper and/or lower limits of the disclosed range.

In a particular embodiment, the present invention provides a method as defined herein wherein the dewaxing conditions comprise a hydrogen partial pressure in the range of 15 bar to 350 bar, preferably a hydrogen partial pressure in the range of 15 bar to 250 bar. Preferably the hydrogen partial pressure may be in the range of 15 bar to 200 bar, more preferably in the range of 15 bar to 150 bar, even more preferably in the range of 15 bar to 100 bar, most preferably in the range of 15 bar to 50 bar.

In a particular embodiment, the present invention provides a method as defined herein wherein the dewaxing conditions comprise a hydrogen treat gas rate in the range of 100 Nl/l to 1000 Nl/l, preferably a hydrogen treat gas rate in the range of 100 NI/I to 500 NI/I. Preferably the hydrogen treat gas rate may be in the range of 150 NI/I to 450 NI/I, more preferably in the range of 200 NI/I to 400 NI/I, even more preferably in the range of 250 NI/I to 350 NI/I.

It is noted that the hydrogen treat gas rate may also be referred to as the gas to oil ratio.

In a preferred embodiment according to the invention, the hydrogen treat gas rate was kept substantially constant.

In a particular embodiment, the present invention provides a method as defined herein wherein the catalyst comprises at least 5 wt % of metal oxide support, wherein the metal oxide support may be one or more selected from the group of alumina, silica, silica-alumina, magnesium oxide, and titania, and wherein at least 300 ppm of hydrogenation metal is included. Preferably, the hydrogenation metal may be one or more selected from the group of Pt, Pd, Ni, Co, Mo, W, and Fe; in particular Pt, Pd, Ni, Co, and Fe.

In a particular embodiment, the present invention provides a method as defined herein wherein the alkaline-treated zeolite has the framework topology of MTT, TON, AEL, MRE, MTW, MFI, FER, or MEL; in particular MTT, TON, AEL, MRE, MTW, MFI, or MEL; more in particular MFI or FER.

In a particular embodiment, the present invention provides a method as defined herein wherein the alkaline-treated zeolite has a unidirectional micropore structure and 10 member rings.

In a particular embodiment, the present invention provides a method as defined herein wherein the volume of mesopores in the parent zeolite and/or alkaline-treated mesoporous zeolite having a diameter in the range of 4 to 20 nm may be in the range of 0.05 to 0.3 ml/g, wherein the volume of mesopores in the parent zeolite and/or alkaline-treated mesoporous zeolite having a diameter of more than 20 nm may be more than 0.2 ml/g, and wherein the ratio of mesopores having a diameter in the range of 4 to 20 nm to mesopores having a diameter of more than 20 nm may be smaller than 1.0.

In a particular embodiment, the present invention provides a method as defined herein wherein the alkaline-treated mesoporous zeolite may be prepared using an alkaline treatment at a pH>10.

In a particular preferred embodiment, the present invention provides a method as defined herein wherein the alkaline treatment may be executed gradually.

In a particular embodiment, the present invention provides a method as defined herein wherein the alkaline treatment is executed by flowing an alkaline solution through a stationary membrane containing the parent zeolite.

In a particular embodiment, the present invention provides a method as defined herein wherein the preparation of the alkaline-treated mesoporous zeolite using an alkaline treatment at a pH>10 comprises the steps of:

providing a suspension of a parent zeolite in an aqueous solution, wherein the aqueous solution has a pH of at most 8 and comprises at least one salt comprising an element selected from the group of Mg, Ca, Ti, V, Cr, Ni, Co, Fe, Cu, Mn, La, Ce, W, Mo;

adding a base to the suspension, thereby forming a reaction mixture, wherein the pH of the aqueous solution is increased to at least 10;

reacting the base and the parent zeolite in the suspension, thereby obtaining said alkaline-treated mesoporous zeolite; and separating the alkaline-treated mesoporous zeolite from the suspension.

In a particular embodiment, the present invention provides a method as defined herein wherein the step of reacting the base and the zeolite in the suspension may be performed at a temperature in the range of 25° C. to 100° C. Preferably, the temperature may be in the range of 40° C. to 80° C., more preferably, the temperature may be in the range of 60° C. to 80° C.

In a particular embodiment, the present invention provides a method as defined herein wherein the step of reacting the base and the zeolite in the suspension may be performed over a time period in the range of 1 minute to 6 hours. Preferably, the step of reacting the base and the zeolite in the suspension may be performed over a time period in the range of 1 minute to 4 hours, more preferably over a time period in the range of 1 minute to 3 hours.

In a particular embodiment, the present invention provides a method as defined herein wherein the step of reacting the base and the zeolite in the suspension may be performed at a solid-to-liquid ratio of 5 g/L to 300 g/L, wherein the solid refers to the parent zeolite. Preferably, the solid-to-liquid ratio may be in the range of 5 g/L to 250 g/L, more preferably the solid-to-liquid ratio may be in the ratio of 50 g/L to 250 g/L, even more preferably the solid-to-liquid ration may be in the ratio of 100 g/L to 200 g/L.

In a particular embodiment, the present invention provides a method as defined herein wherein the step of reacting the base and the parent zeolite in the suspension may be performed at a concentration of base in the range of 0.5 mmol to 25 mmol base per gram of parent zeolite.

In a particular embodiment, the present invention provides a method as defined herein wherein the alkaline treatment is performed in the presence of 0.1 to 30 mmol salts comprising an element from the group of Mg, Ca, Ti, V, Cr, Ni, Co, Fe, Cu, Mn, La, Ce, W, and Mo, per gram of parent zeolite.

In a particular embodiment, the present invention provides a method as defined herein further comprising the step of:

performing a subsequent acid treatment; and/or
    performing an ion exchange treatment; and/or
    performing a calcination treatment; and/or
    shaping the alkaline-treated mesoporous zeolite in a macroscopic shaped catalyst particle.
    Preferably, the macroscopic shaped catalyst particle is an extrudate.

In a particular embodiment, the present invention provides a method as defined herein wherein the alkaline-treated mesoporous zeolite is in the protonic form.

Accordingly, in a second aspect, the present invention provides a dewaxing catalyst comprising an alkaline-treated mesoporous zeolite with the MTT framework topology and at least 300 ppm of Pt or Pd, wherein the alkaline-treated mesoporous zeolite further comprises a molar Si/Al ratio of at least 20, a mesopore volume in the range of 0.4 to 1.2 ml/g and/or external surface in the range of 100 to 350 m$^2$/g, and a Bronsted acidity as measured using pyridine of at least 50 μmol/g.

In a particular embodiment, the present invention provides a dewaxing catalyst comprising an alkaline-treated mesoporous zeolite with the MTT framework topology as defined herein further comprising a magnesium content in the range of 0.3 wt % to 10 wt %.

In yet a further aspect, the present invention provides a alkaline-treated mesoporous zeolite with the MTT framework topology, wherein the alkaline-treated mesoporous zeolite further comprises a molar Si/Al ratio of at least 20, a mesopore volume in the range of 0.4 to 1.2 ml/g and/or external surface in the range of 100 to 350 m$^2$/g, and a Bronsted acidity as measured using pyridine of at least 50 mol/g. Preferably, the alkaline-treated mesoporous zeolite comprises at least 300 ppm of Pt or Pd.

In a particular embodiment, the present invention provides an alkaline-treated mesoporous zeolite with the MTT framework topology as defined herein further comprising a magnesium content in the range of 0.3 wt % to 10 wt %.

In yet a further aspect, the present invention provides a hydrocarbon feed comprising a fraction in the boiling point range of 150° C. to 370° C. of at least 90%, a cloud point of at most −25° C., pour point of at most −28° C., a kinematic viscosity at 30° C. of at least 4.42 mm$^2$/s, and a density of at most 0.8300 g/ml. Preferably the density is at most 0.830 g/ml, more preferably the density is at most 0.8300 g/ml.

In yet a further aspect, the present invention provides a dewaxing catalyst comprising an alkaline-treated mesoporous zeolite with the MFI framework topology and at least 300 ppm of Pt or Pd, wherein the alkaline-treated mesoporous zeolite further comprises a molar Si/Al ratio of at least 20, a mesopore volume in the range of 0.15 to 1.2 ml/g and/or external surface in the range of 100 to 350 m$^2$/g, further comprising a magnesium content in the range of 0.3 wt % to 15 wt %.

In a particular embodiment, the present invention provides the dewaxing catalyst comprising an alkaline-treated mesoporous zeolite with the MFI framework topology as defined herein wherein the magnesium displays a dispersion of at least 50% as determined using oxalic acid chemisorption.

In yet a further aspect, the present invention provides a mesoporous zeolite with the MFI framework topology with a molar Si/Al ratio of at least 20, a mesopore volume in the range of 0.15 to 1.2 ml/g and/or external surface in the range of 100 to 350 m$^2$/g, further comprising a magnesium content in the range of 0.3 wt % to 15 wt %.

In a particular embodiment, the present invention provides the alkaline-treated mesoporous zeolite with the MFI framework topology as defined herein wherein the magnesium displays a dispersion of at least 50% as determined using oxalic acid chemisorption.

In yet a further aspect, the present invention provides a method for dewaxing a hydrocarbon feedstock, said method comprising the steps of:

providing a hydrocarbon feedstock to a reactor;
    providing a catalyst to the reactor; and
    contacting the hydrocarbon feedstock with the catalyst under dewaxing conditions, wherein the catalyst comprises an alkaline-treated mesoporous zeolite and a hydrogenation metal,
    wherein the alkaline-treated mesoporous zeolite comprises a framework density (FD$_{Si}$) of 17 to 20 T/nm$^3$, a molar Si/Al ratio of 20 to 400, wherein the hydrocarbon feedstock before the step of contacting has a cloud point of at least −5° C. and a pour point of at least −10° C., wherein the hydrocarbon feedstock after the step of contacting has cloud point in the range of −10° C. to −45° C., and wherein the percentage diesel loss per degree Celsius of cloud point improvement is at most 0.1%/° C.

DETAILED DESCRIPTION

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

As already detailed herein above, the present invention provides a method for dewaxing a hydrocarbon feedstock using a catalyst comprising particular alkaline-treated mesoporous zeolites.

It was found that the alkaline-treated mesoporous zeolites and catalysts of the present invention can significantly reduce cracking of the hydrocarbon feed, and accordingly significantly reduce liquid hydrocarbon feed loss during processes such as dewaxing.

The method of the present invention dewaxes hydrocarbon streams, such as hydrocracked bottoms, diesel fuels, and hydrotreated vacuum gas oils. The method according to the invention operates by contacting the hydrocarbon feed stream with an alkaline-treated mesoporous zeolite, or catalyst comprising the same as defined herein. The catalysts of the present invention are very effective at reducing the pour and cloud points of feedstock selected from wax, diesel, base oil, hydrowax, lube oil, Fischer-Tropsch derived oil, biomass-derived oils such as vegetable oil and deoxygenated fatty acids; or any combination thereof. Feed selected from carboxylic acids and/or derivatives thereof, such as fatty acids, esters of fatty acids, fatty alcohols, fatty aldehydes, anhydrides of fatty acids, and metal salts of fatty acids of biological or synthetic origin, or combinations thereof may also be suitably used in the method of the invention. Therefore, the method according to the invention enables to provide a method to efficiently and effectively provide the desired hydrocarbons from the feedstock. In addition, due to said efficiency, a larger volume of the desired hydrocarbons may be obtained from the initial amount in comparison to conventional methods. The larger amount of desired hydrocarbons may be due to a lower degree of cracking towards lights (e.g. $C_1$-$C_4$) and may also be due to the lower bulk density of the resulting feedstock.

Accordingly, the method according to the invention may be used to dewax a variety of feedstocks ranging from relatively light distillate fractions up to high boiling stocks, especially those in which waxy components are undesired. The method according to the invention is particularly useful with waxy distillate stocks to produce diesel fuels, gas oils, kerosenes, jet fuels, lubricating oil stocks, heating oils and other distillate fractions whose pour point and viscosity need to be maintained within certain specification limits. Lubricating oil stocks will generally boil above 230° C. (450° F.), more usually above 315° C. (600° F.).

Hydrocracked stocks can be used as a feedstock, as well as other distillate fractions which contain significant amounts of waxy n-paraffins produced by the removal of polycyclic aromatics. The feedstock for the present process will normally be a C10+ feedstock, preferably a C16+ feedstock, containing paraffins, olefins, naphthenes, aromatics, and heterocyclic compounds, with a substantial proportion of high molecular weight n-paraffins and slightly branched paraffins which contribute to the waxy nature of the feedstock.

Typical waxy feedstocks on which dewaxing according to the invention may be suitably executed are waxes, waxy feedstocks, waxy raffinates, waxy distillates, slack wax, heavy hydrocrakate, and Fischer-Tropsch-derived waxy feeds.

The method according to the invention may also be used for the superior dewaxing of feedstocks comprising unsaturated compounds, such as triglycerides, carboxylic acids having a carbon number $C_1$-$C_{38}$, esters of $C_1$-$C_{38}$ carboxylic acids with $C_1$-$C_{11}$ alcohols, esters of $C_1$-$C_{38}$ carboxylic acids with $C_{12}$-$C_{38}$ alcohols, natural waxes, and dicarboxylic acids. Such oxygenated hydrocarbons are dewaxed preferably in combination with a ketonisation step and/or a hydrodeoxygenation step.

Examples of suitable feedstocks are biologically-derived streams such as plant fats, plant oils, plant waxes, animal fats, animal oils, animal waxes, fish fats, fish oils, fish waxes, starting materials derived from algae and insects, and free fatty acids or fatty acids obtained by hydrolysis, acid transesterification or pyrolysis reactions from plant fats, plant oils, plant waxes, animal fats, animal oils, animal waxes, fish fats, fish oils, fish waxes, and esters obtained by transesterification from plant fats, plant oils, plant waxes, animal fats, animal oils, animal waxes, fish fats, fish oils, fish waxes, and fatty acid alkyl esters obtained by esterification of alcohols with fatty acids of plant, animal and fish origin, and waste and recycled food grade fats and oils, and fats, oils and waxes obtained by genetic engineering, and mixtures of said materials. Other preferred biologically-derived feedstocks are rapeseed oil, colza oil, canola oil, tall oil, sunflower oil, soybean oil, hempseed oil, olive oil, linseed oil, mustard oil, palm oil, peanut oil, castor oil, coconut oil, lard, tallow, train oil or fats contained in milk.

It is also desirable to incorporate the alkaline-treated mesoporous zeolite in a binder (or matrix) material. The binder materials include, but are not limited to, inorganic materials such as clay, silica and/or metal oxides. The metal oxide can be a metal oxide binder material such as alumina ($AL_2O_3$), silica-alumina, silica-magnesia, silica-zirconia, silica-thoria, silica-berylia, silica-titania, as well as ternary compositions such as silica-alumina-thoria, silica-alumina-zirconia, silica-alumina-magnesia, and silica-magnesia-zirconia. Preferred binders are alumina based, most preferred being gamma-alumina. Another preferred binder is titania. An advantage of using titania as binder is that a catalyst composition substantially free of non-zeolitic silica and non-zeolitic alumina is enabled. Preferred binders feature total surface areas exceeding 100 $m^2$ per g.

In a preferred embodiment according to the invention, the alkaline-treated mesoporous zeolite is incorporated in a binder, wherein the binder may be present in the range of 10 wt. % to 80 wt. %, preferably present in the range of 20 wt. % to 70 wt. %, more preferably present in the range of 20 wt. % to 50 wt. %.

Hydrogenation metal: The catalysts of the present invention require both an alkaline-treated mesoporous zeolite and a metal in order to function in the methods of the invention. At least one hydrogenation metal is incorporated, i.e. deposited, onto the catalyst before or after, preferably after the binder and/or support, such as refractory metal oxide support, has been incorporated with the molecular sieve. At least one hydrogenation metal, such as Pd, Pt, Ni, Fe, Co, can be deposited by any means known to be effective at doing so. In an alternative preferred embodiment, hydrogenation metals Mo and/or W can be deposited by any means known to be effective doing so. Preferably, the hydrogen metals Mo and/or W are deposited in combination with any one of the hydrogenation metals Pd, Pt, Ni, Fe, and Co. In a preferred embodiment, the hydrogenation metals Mo and/or W are combined with Ni to be deposited. Non-limiting examples of suitable incorporation means include incipient wetness, ion exchange, mechanical mixing of metal oxide precursor(s) with molecular sieve and binder, or a combination thereof, with the incipient wetness technique being the preferred method.

A typical catalyst is made up of 15-80% of alkaline-treated mesoporous zeolite, at least 15% of binder, and noble metals (such as Pt or Pd, 300 pm-0.2 wt %) or base metals (such as Ni—several wt %); wherein the amount of binder is used as a filler to make up to 100%.

Hydroprocessing Conditions: The feedstock is contacted with the isomerization dewaxing catalysts in the presence of hydrogen under hydroprocessing conditions of elevated temperature and pressure. Conditions of temperature, pressure, space velocity, hydrogen to feedstock ratio and hydrogen partial pressure which are similar to those used in conventional isomerization dewaxing operations can be employed herein.

The feedstock is typically contacted with the isomerization dewaxing catalyst in a fixed-bed reactor. Herein, the feedstock is fed through the fixed-bed reactor, wherein a bed of isomerization catalysts is present, typically in the form of extrudates.

The temperature of the method according to the invention of from about 200° C. to about 485° C. can be used although temperatures above about 420° C. will normally not be employed as the reactions and/or method according to the invention become unfavorable at temperatures above this point. Total pressure is in the range from about 15 bar to about 350 bar with pressures of about 15 to 250 bar being preferred. The weight or liquid hourly space velocities is in the range 0.1 to 10 h$^{-1}$, with hourly space velocities of 0.2 to 5 h$^{-1}$ being preferred.

It was found that the dewaxing method of the present invention applied to a hydrocarbon feedstock as defined herein, provides efficient and effective improvements of the cloud point and pour point, whereas the losses of middle distillates through over-cracking are significantly reduced. Hence, during the dewaxing of diesel, a higher diesel retention is achieved, whereas in lube dewaxing a higher lube retention is achieved.

In particular the cloud point of the hydrocarbon feedstock can be reduced by at least 10° C. For example, resulting for diesel dewaxing in a hydrocarbon feedstock having a cloud point of less than −10° C. and a pour point of less than −15° C. For lube dewaxing the ranges may differ. For example, the pour point for lube dewaxing may be reduced from around 50° C. to below 0° C. Furthermore, the quality of the feedstock can be enhanced by improvements in density and viscosity. In addition, the degree of aromatics can be significantly reduced, giving rise to an improved viscosity and a lowered coloring and toxicity of the product stream, something particularly relevant for the dewaxing of lubes. In addition, for diesel dewaxing, the diesel losses are less than 0.2% per degree Celsius of Cloud Point Improvement. Preferably, the diesel losses are less than 0.15%/° C., and most preferably less than 0.1%/° C.

As used herein, and unless otherwise specified, the term 'zeolite' may be defined as a crystalline material of which the chemical composition includes essentially aluminium, silicon and oxygen.

Typically, zeolites are described as aluminosilicates with a three-dimensional framework and molecular sized pores. Certain zeolitic materials are ordered, porous crystalline aluminosilicates having a definite crystalline structure as determined by X-ray diffraction, within which there are a large number of smaller cavities which may be interconnected by a number of still smaller channels or windows. Zeolites are generally characterized by the equation, $H_xAl_xSi_{1-x}O_2$, where H can be replaced by any other univalent cation, such as sodium or potassium, or (when the x related to H is divided by the valence) a multivalent cation, such as magnesium or calcium. The term zeolite also refers to an open tetrahedral framework structure capable of ion exchange, and loosely held water molecules, that allow reversible dehydration. The term 'zeolite' also includes 'zeolite-related materials' or 'zeotypes' which are prepared by replacing $Si^{4+}$ or $Al^{3+}$ with other elements as in the case of aluminophosphates (e.g., MeAPO, SAPO, ElAPO, MeAPSO, and ElAPSO), gallophosphates, zincophosphates, titanosilicates, etc. The zeolite can be a crystalline porous material with any fully ordered or partially disordered framework topology provided in the Zeolite Framework Types database of the International Zeolite Association (IZA) structure commission.

The invention is particularly relevant for zeolites which feature a framework density higher than 17 T-atoms per cubed nanometer (T/nm³), and particularly those with 10 membered rings. The zeolites of the present invention in particular have a framework topology selected from the list comprising: AEL, MRE, MFI, MEL, MTT, TON, FER, or MTW framework topology. It was found that said framework topologies enable an efficient and effective dewaxing. The three-letter framework codes (such as 'MRE') describe and define the network of the corner sharing tetrahedrally coordinated framework atoms. The tetrahedrally coordinated framework atoms are referred to as 'T-atoms', and are most commonly Si and Al, but can also be other elements such as Ga, B, and P. The framework density can be expressed by the number of T-atoms per cubic nanometer, also referred to as 'T/nm³'. The framework density will depend to a certain extent on the type of elements present as T-atoms. The framework densities used herein are therefore based on the most common T-atom, that is, silicon, yielding the 'FD$_{Si}$'. The 'member ring' or 'membered ring' or 'MR' relate to the smallest number of T-atoms required to form the circumference of the accessible micropore channels of the zeolites. Hence, the member rings relate to the micropore sizes a zeolite framework features: 10 member ring frameworks (MFI, MTT, MRE) have typically smaller micropore sizes compared to frameworks with 12 member rings (BEA and FAU). Some zeolite frameworks feature two types of member rings, such as FER. Within a certain framework, different zeolite materials can be classified. For example, both ZSM-5 and silicalite-1 materials fall within the MFI framework, whereas both ZSM-48 and EU-2 materials fall within the MRE framework. The distinction between different materials often relates to the composition of the T-atoms. It is likely and assumed that, as long as the zeolite framework is intact (something which is routinely checked with powder X-ray diffraction), that the bulk framework topology and density do not change significantly during mesoporization via alkaline treatment.

The alkaline-treated mesoporous zeolites in accordance with the invention are generally prepared by an alkaline treatment, wherein the alkaline treatment comprises contacting a parent zeolite with an aqueous solution at pH>10 in the presence of at least one salt comprising an element selected from the group of Mg, Ca, Ti, V, Cr, Ni, Co, Fe, Cu, Mn, La, Ce, W, and Mo.

The untreated zeolitic materials, that is before the alkaline treatment, are typically referred to as 'parent' zeolites. Parent zeolites may also feature varying degrees of mesoporosity, which is typically originated from the hydrothermal synthesis, and often relates to the average zeolite crystal size. Parent zeolites with smaller average crystal sizes typically feature larger mesopore volumes and/or mesopore surfaces. Typically, the base treatment will result in the enhancement of the mesopore volume or mesopore surface area of the parent zeolite. Still, in some cases, the alkaline treatment may result in a similar mesopore surface or mesopore volume, or even a reduction. In such cases, the invention may remain effective based on the different nature of the mesopore surface or volume generated. In other words, the mesopore quality resulting from the inventive alkaline treatment is specific to yield the catalytic benefit in dewaxing.

Alkaline treatment: An important element of the invention regards the alkaline treatment of zeolites. This may be done using several approaches, such direct alkaline treatment, gradual alkaline treatment, suspension-based and in a configuration with the zeolite located in a stationary layer with the alkaline media flowing through it.

As used herein, and unless otherwise specified, the term "base treatment" also termed "base leaching" also termed "alkaline treatment" refers to contacting conventional (parent) zeolites with alkaline aqueous solutions, yielding alkaline-treated mesoporous zeolites by removing part of the solid to give way to intra-crystalline or inter-crystalline mesopores. Base treatments enable to convert most conventional (parent) zeolites into superior mesoporous analogues.

The preferred solvent for the alkaline treatment is water. In some embodiments, other solvents are used, such as alcohols (methanol, ethanol, or isopropanol). Typical solutions are in water with pH varying from at least 10 to at most 14, which relates to concentrations of NaOH of 0.0001 M to 1 M. The solid-to-liquid ratio ((parent) zeolite to liquid of base) may vary from very low 1 g $L^{-1}$ to very high 1000 g $L^{-1}$. It will be understood that other solid-to-liquid ratios may also be suitable. The temperature may range from at least room temperature to at most 100° C., preferably from at least 50° C. to at most 90° C., more preferably from at least 50° C. to at most 70° C. The concentration of base is in the range of 0.5 to 25 mmol base per gram of parent zeolite added.

The amount of base used in the alkaline treatment varies preferably from about 0.1, 0.2, 0.3, 0.4, 0.5, 1, 2, 5, 10, 15 or 20 to about 40, 45, 50, 55, 60, 65, 70, 75 or 100 mmol of base per gram of parent zeolite, more preferably from about 0.5, 1, 1.5 or 2 to about 30, 35, 40, 45 or 50 mmol of base per gram of parent zeolite, and most preferably from about 2.5, 3 or 3.5 to 18, 19, 20, 21 or 22 mmol of base per gram of parent zeolite. The time of treatment can vary broadly from about 1 minute to 24 hours, but ranges preferably from about 1, 1.5, 2, 2.5 or 3 to about 120, 180, 200, 220, 240, 260, 280 or 300 minutes, more preferably from about 2, 3, 4, 5, 6, 7, 8, 9 or 10 to about 100, 110, 120, 130 or 140 minutes and most preferably from about 7, 8 or 9 to about 57, 58, 59, 60, 61, 62 or 63 minutes.

In a specific embodiment, the base is an inorganic base selected from the list comprising: NaOH, KOH, CsOH, LiGH and $NH_4OH$. Any base can be used as long as it is able to increase the pH to a value of 8 or higher. The preferred bases to make the alkaline solution are inorganic hydroxides such as NaOH, LiOH, KOH, RbOH, CsOH, $NH_4OH$ and $Mg(OH)_2$. In some embodiments, inorganic non-hydroxides alkaline sources can be used such as $(NH_4)_2CO_3$, $Na_2CO_3$ and sodium hydride (NaH). In other embodiments, organic bases can be used, such as tetrapropylammonium hydroxide, diethylamine, dipropylamine, tetrabutylammonium hydroxide and tetraethylammonium hydroxide (TEAOH).

Direct Alkaline treatment: In a particular embodiment, the mesoporous zeolite may be prepared using a direct alkaline (or base) treatment step. Accordingly, in a specific embodiment, the alkaline-treated mesoporous zeolite is prepared using an alkaline treatment at a pH>10.

Base leaching is a widely used method to create mesoporosity in zeolites. Descriptions of how to execute such treatments can be found in open literature, such as in Colloids and Surfaces A: Physicochemical and Engineering Aspects, 241, 2004, 53-58. Typical base treatments are executed in a 'direct' fashion, meaning the zeolite is contacted in one go with an alkaline solution. The latter is typically achieved by adding a zeolite powder to an alkaline solution. This method is different from gradual alkaline treatments where the zeolite is exposed to the base through a gradual or stepwise addition (see Process A-C).

Gradual alkaline treatment: Gradual base treatment represents a process for preparing an alkaline-treated mesoporous zeolite, wherein the method comprises the steps of:
a) providing a parent zeolite, at an amount of $m_s$;
b) providing a total amount of base $m_{b,total}$; and, c) contacting and reacting the parent zeolite with an amount of base $m_b(t)$ in a solution over a time frame $\Delta t$ for the total amount of base $m_{b,total}$;
thereby obtaining an alkaline-treated mesoporous zeolite; wherein the maximum amount of base $m_{b,max}$ of $m_b(t)$ brought into contact with parent zeolite $m_s$ at any given time t in step c) is smaller than $m_{b,total}/m_s$.

The total amount of base can be provided in the form of a solid alkali or an alkaline solution, preferably an alkaline solution.

In some embodiments, the process comprises the stepwise contacting of the solid to the base, hereby largely preventing fragmentation. As a result, particle and crystal pore sizes may be obtained which are similar to the starting solid.

The ratio $m_{b,max}/m_s$ may be considered to be the maximum amount of base brought into contact with the solid at any time.

In some preferred embodiments, the maximum amount of base $m_{b,max}$ of $m_b(t)$ at any given time t in step c) is at most than $0.75*m_{b,total}$, preferably at most than $0.50*m_{b,total}$, preferably at most than $0.25*m_{b,total}$.

In some preferred embodiments, step a) comprises:
a') providing the parent zeolite at an amount of $m_s$ suspended in a solution, preferably in water.

By adding the base to a suspension of parent zeolite, for example in water ($t_{mb}>t_{ms}$), the non-instantaneous mixing/dissolution of the base implies that the initial value of $m_{b,max}/m_s<m_{b,total}/m_s$.

In some embodiments, the base is added in multiple discrete steps. The zeolite is not separated in between these steps. In some preferred embodiments, the method comprises a number of base additions which are not separated by a solid separation step, and an amount of base added per addition ($m_{b,i}$ with i=1 . . . x), characterised in that x is not equal to 1, preferably wherein x is at least 2, preferably at least 3, preferably at least 4.

In some embodiments, the base is added gradually or continuously. The alkaline-treated mesoporous zeolite is not separated during this gradual addition. In some preferred embodiments, the rate of adding the amount of base over time is at most 3.0 mmol $g^{-1}$ $min^{-1}$, preferably at most 1.0 mmol $g^{-1}$ $min^{-1}$, preferably at most 0.5 mmol $g^{-1}$ $min^{-1}$. The unit mmol $g^{-1}$ $min^{-1}$ relates herein to mmol of base per gram of parent zeolite per min of reaction of the alkaline treatment.

In some preferred embodiments, the base is continuously added to the parent zeolite during a time frame $\Delta t$, wherein the time frame $\Delta t$ for adding the total amount of base $m_{b,total}$ is at least 15 s, preferably at least 30 s, for example at least 60 s, for example at least 2 min, for example at least 4 min, for example at least 8 min, for example at least 15 min, for example about 30 min. In some embodiments, $\Delta t$ is at least 8 min and at most 6 hours, preferably at least 15 min and at most 60 min, for example about 30 min. Furthermore, the $\Delta t$ for adding the total amount of base $m_{b,total}$ is at most 5 hours, preferably at most 4 hours, more preferably at most 3 hours, or any time frame in therein between.

In some embodiments, the gradual alkaline treatment may be performed by flowing an alkaline solution through a parent zeolite containing membrane. This may be achieved using a filtration device, such as a Buchner filter (see Zeolite 5) or plate filter. In addition, the base may be contacted with the parent zeolite in a continuous stirred-tank reactor, or any other configuration that enables a gradual or stepwise contacting of the solid with the base.

Suitable salts in alkaline treatment: Another important embodiment regards the presents of inventive salts in the alkaline treatment. This can be achieved using a process comprising the steps: a) contacting a parent zeolite with an aqueous solution of pH<8 in which at least one salt with an 'Acid Solubility' >95% and 'Alkaline Solubility'<95% is dissolved, b) adding a base to the solution or suspension of step a), thereby increasing the pH >8, and letting react said alkaline solution with the parent zeolite thereby increasing the mesoporosity of the zeolite and c) isolating the alkaline-treated mesoporous zeolite from the suspension of step b. This process can be complemented with subsequent ion exchange of acid treatment steps.

In a preferred embodiment, the addition of base as used in alkaline treatments with inventive salts is performed in a similar manner as defined herein for the gradual alkaline treatment, i.e. in a dropwise fashion.

In particular, the mesoporous material (i.e. alkaline-treated mesoporous zeolite) may be prepared by bringing an untreated (parent) zeolite in suspension with an aqueous solution of neutral or acidic pH, in which is dissolved at least one specific type of salt (Step a). The latter salt may be of the nature that it completely or near-completely dissolves in acidic or neutral solutions, and of which the cation or anion may completely or partially precipitate when the aqueous solution is alkaline. Said suspension of the parent zeolite in the salt-containing aqueous solution of step a may then be contacted with a base in order to increase the pH to 8 or higher and hereby initiate the precipitation of the salt and mesopore formation (Step b). After the suspension has been reacted in alkaline media for a specific amount of time, the suspension may be separated (Step c).

In the case a gradual alkaline treatment is performed in a fixed-bed/membrane configuration, the salt is preferably added to the alkaline solution prior to passing through the zeolite-membrane.

In some embodiments, the resulting alkaline-treated mesoporous zeolite may be exposed to further post-synthetic steps, such as ion exchange treatments and calcination targeted to obtain the active (protonic) form of the alkaline-treated mesoporous zeolite.

As used herein, and unless otherwise specified, the term 'salt' refers to a combination of cation and anion, and does not imply anything else, such as whether it is dissolved or the state of aggregations, such as a solid or a liquid.

Suitable salts are apart from other salts than have been used in the prior art base treatment of zeolites aimed at mesopore formation, such as TPABr, aluminum and gallium nitrates, and sodium chloride, all of which tend to fully dissolve at high pH. That being said, any salt that completely or near-completely dissolves at pH values higher than 8 is not within the embodiments of the invention and, therefore, not regarded as a suitable salt. Examples of such unsuitable salts are several salts containing a group one element of the Periodic table such as most basic salts, such as NaCl, KBr and NaNO$_3$. Other salts that are outside the scope are Al(NO$_3$)$_3$ and Ga(NO$_3$)$_3$, and most tetraalkylammonium salts (such as TPABr or CTABr).

The amount of salt with respect to the amount of zeolite to be treated (parent zeolite) (herein also called: "preferred amount of suitable salt") can vary substantially per type of zeolite and per type of salt used.

The preferred amount of suitable salt ranges preferably from about 0.01, 0.05 or 0.1 to about 5, 6, 7, 8, 9 or 10 mmol of salt per gram of parent zeolite, more preferably from about 0.25 or 0.3 to about 4.5 or 5 mmol g$^{-1}$, and most preferably from about 0.45 or 0.5 to about 1.7, 1.8, 1.9 or 2 mmol g$^{-1}$.

The preferred amount of suitable salt also preferably ranges from about 0.001, 0.005, 0.01, 0.02, 0.03, 0.04 or 0.05 to about 3, 4, 5, 6 or 7 gram of salt per gram of parent zeolite, more preferably from about 0.01 to 5 or 0.045 or 0.05 to about 1.5, 2 or 2.5 g g$^{-1}$ and most preferably from about 0.24, 0.25 or 0.26 to about 0.95, 1 or 1.05 g g$^{-1}$.

Preferred suitable salt concentrations preferably range from about 0.001, 0.002, 0.005, 0.01 or 0.02 to about 0.5, 0.75, 1, 1.1, 1.25 or 1.5 M, more preferably from about 0.01 to 0.5 M and most preferably from about 0.025, 0.03 or 0.035 to about 0.18, 0.19, 0.2, 0.21 or 0.22 M. Alternatively, preferred suitable salt concentration preferably range from about 0.05 to 40 mmol g$^{-1}$ of parent zeolite, more preferably range from about 0.1 to 30 mmol g$^{-1}$ parent zeolite.

In addition, as used herein the salts as used in the processes of the present invention may contain a group two element of the Periodic table, selected from the list comprising: magnesium, calcium, strontium and barium, or alternatively: titanium, zirconium, vanadium, tin, chromium, manganese, iron, cobalt, nickel, copper, zinc, lanthanum and cerium; in particular selected from titanium, zirconium, vanadium, tin, chromium, manganese, iron, cobalt, nickel, copper and zinc. Accordingly, in a particular embodiment of the invention, the salt as used herein comprises an element selected from the group of Mg, Ca, Ti, V, Cr, Ni, Co, Fe, Cu, Mn, La, Ce, W, Mo; exemplary salts are for example: Fe(NO$_3$)$_3$, Mn(NO$_3$)$_2$, Co(NO$_3$)$_2$, Mg(NO$_3$)$_2$ Ni(NO$_3$)$_2$.

Within this description and the examples, the degree of hydration of the salt is not mentioned, as the mentioned salt amounts are typically based on molarities instead of weight, and the degree of hydration of the salt is assumed to have a negligible influence as the alkaline treatments are typically performed in an excess of water.

Within the group of suitable salts, several other criteria exist which render a salt more favorable. These criteria may be based on the efficiency of the salt in the mesopore formation, but also on the cost, toxicity, and potential role in catalyzed reactions. Different suitable salts can also be mixed with other suitable salts or with salts used in the state of the art in order to get an enhanced efficiency. Of the suitable salts, the cation is of the largest importance as its hydroxide can be the precipitating salt.

Suitable salt cations may comprise elements from Group 2 of the Periodic Table, such as beryllium, magnesium, calcium, strontium, and barium. Of this group of elements, magnesium and calcium are preferred elements.

Other suitable salt cations may comprise elements of Period 4 of the Periodic Table with atomic numbers ranging from 22 till 30, such as titanium, vanadium, chromium, manganese, iron, cobalt, nickel, copper, and zinc. The elements iron, zinc, nickel, cobalt, and cupper are preferred elements.

Other suitable salt cations may comprise elements of Period 5 of the Periodic Table with atomic numbers ranging from 40 till 50. The elements zirconium, molybdenum, and tin are preferred elements.

Other suitable salt cations may comprise refractory metals, such as chromium, molybdenum and tungsten (or wolfram).

Other suitable salt cations may comprise rare earth elements, such as scandium, yttrium, lanthanum, cerium, praseodymium, neodymium, and samarium. The elements lanthanum and cerium are preferred elements.

Of the suitable salts, the anion is assumed to be generally less critical as the cation. Suitable anions are based on availability, cost, and on the influence on the acid and alkaline solubility. Suitable salt anions can be inorganic species such as $NO_3^-$, $PO_4^{3-}$, $SO_4^{-2}$, $Cl^-$, and $Br^-$ and can also be common organic species such as alkoxides (such as in titanium propoxide) or those based on carboxylic acids such as acetate, citrate and malate. Suitable salts may be one or more selected from the group of magnesium nitrate, magnesium hydroxide, magnesium acetate, magnesium carbonate, calcium sulphate, iron chloride, nickel nitrate, and nickel acetate.

The suspension as defined herein may be prepared in several fashions, as long as the end result comprises a suitable amount of salt being in solution and the parent zeolite being suspended or otherwise contacted with the alkaline solution, such can be achieved with the parent zeolite cake placed on a membrane. In some embodiments, the parent zeolite may be added to a stirred solution dissolved salt or the salt may be added to the stirred suspension of parent zeolite in water.

Some embodiments include impregnating the parent zeolite with a suitable amount of salt, followed by introducing the obtained salt/parent zeolite composite to a stirred watery solution. The pH of the solution may be lowered, for example by adding small amounts of mineral acids, to ensure the salt is adequately dissolved. The time of interaction between the parent zeolite and the dissolved salt is assumed to be of minor influence.

In a next step, the pH of the suspension may be increased to a pH≥8 to neutralize the potentially acidic salt-containing solution, to hereby partially precipitate the salt, and to generate the alkaline conditions to induce mesopore formation in order to increase the mesoporosity of the zeolite. The required pH depends strongly on the nature of the to-be-treated (parent) zeolite and the used salt and varies preferably from pH 9 to 14, more preferably from pH 11 to 13.5, and most preferably from pH 12 to 13.

Subsequently, the treated zeolite (alkaline-treated mesoporous zeolite) may be separated from the solution using established separation techniques such as Buchner filtration, plate filtration, or centrifugation. After said separation, the resulting solids may be washed with water in order to remove dissolved species from the solid, and finally dried in an oven to a desired level of humidity.

Subsequent ion exchange and acid treatments: A further important embodiment of the current invention relates to the process for generating superior dewaxing catalyst through alkaline treatment of zeolites, further characterized in that a complementary acid treatment or ion exchange step performed after the separation of the zeolite from the alkaline solution.

Generally, the metal deposition as achieved using the present invention is rather different compared to state of the art method deposition techniques, such as ion exchange and incipient wetness impregnation. The metals deposited with the invention are present at much higher metal dispersions. Where typical state-of-the-art methods yields dispersions of about 10-15%, the invention yields dispersions of 50-90%. Importantly, the metal stability in subsequent modifications in aqueous media is much higher (see for example Zeolite 3). As such, the invention enables subsequent ion exchange steps after the alkaline-induced metal deposition, which would otherwise result in the complete removal of the metal.

In particular, the order of the post-synthetic treatment steps and manner of executing the ion exchange and/or acid treatments is largely dependent on the targeted amount of remaining metals on the solid. It is generally preferable to have all univalent cations removed, whereas the presence of certain metals on the solids, such as Mg, Ca, and Ni, may be desired to yield optimal dewaxing performance. Accordingly, different scenarios could be envisaged to tune the amount of remaining inventive metals on the solid. Examples hereof are:

1) No metals are targeted and a subsequent acid step is performed in a large excess of protons (and in the absence of undesired cations). In this case the acid removes >90% of the metals and at the same time removes sodium, potassium, or lithium (typically originating from the base treatment) leaving the alkaline-treated mesoporous zeolite in the protonic form, making a subsequent IE obsolete.

2) If all metals are to be removed (>90% removal), but the undesired cations are not completely removed during the acid treatment. In this case, the acid treatment is executed, followed by an IE in common ammonium salts, such as ammonium nitrate or ammonium sulphate, see synthesis Zeolite 2.

3) If some metal containing is strived after (20-90% removal), no acid step is performed, and a mildly acidic IE is executed, see synthesis Zeolite 3.

4) If some metal containing is strived after (20-90% removal), no acid step is performed, and a mildly basic IE is executed, see synthesis Zeolite A2.

Yet another embodiment of the current invention relates to the activation of the base-treated materials by ion exchange treatments in watery solutions containing predominately ammonium cations. Such treatment, common in the state of the art and often combined with heat treatment, enables to maximize the solid's acidity, often required for use in catalytic applications, by removal of unwanted cations such as sodium, potassium, lithium, and cesium.

Accordingly, in a specific embodiment, the present invention provides a process as defined herein wherein a complementary ion exchange treatment (IE) is executed after the mesoporization by alkaline treatment, or where applicable, a complementary ion exchange treatment is executed after the complementary acid step.

Ion exchange treatments can be performed under similar process conditions as the methods for the acid treatment described herein, with the exception to the pH of the ion exchange which is not necessarily acidic and depends mostly on the nature of the use ammonium salt. Still, similar methods of contacting, temperatures, solid-to-liquid ratios, and times can be used to perform the ion exchange treatment. Moreover, to maximize the effect of the ion exchange, typically multiple sequential ion exchange treatments are performed.

In some embodiments, ion exchange is executed using ammonium nitrate, ammonium sulphate, ammonium chloride, ammonium hydroxide, ammonium carbonate, mono ammonium phosphate, di ammonium phosphate, and ammonium acetate.

A further embodiment of the current invention relates to the process for increasing mesoporosity in parent zeolites, further characterized in that a complementary acid treatment step performed after the separation of the alkaline-treated mesoporous zeolite.

After separation following the alkaline treatment, an acid treatment may be performed on the resulting solid. This may be performed on any form of the solid after separation. For example, the acid treatment may be performed after the solid has been separated, washed, and dried, but can also be performed on the non-washed wet solid, and any form in between. The acid treatment can be executed in any required means a solid can be contacted with an acid. For example, it can be performed in a batch reactor but can also be performed by locating the parent zeolite on a membrane followed by flowing an acid solution through the solid-covered membrane. The latter may be performed, for example, directly after the solid has been recovered using a plate filter.

In a specific embodiment, the complementary acid treatment step is performed using one or more organic acids selected from the list comprising: oxalic acid, malic acid, citric acid, monosodium-disodium- and trisodium citrate, acetic acid, benzoic acid, formic acid, ethylenediaminetetraacetic acid ($H_4$EDTA), disodium ethylenediaminetetraacetic acid ($Na_2H_2$EDTA). The preferred acids to make the acidic solutions are mineral acids from the group of HCl, $HNO_3$, $H_2SO_4$, $H_3PO_4$, $H_3BO_3$.

In some embodiments, organic acids from the group of sulphonic acids such as methanesulfonic acid, ethanesulfonic acid, benzenesulfonic acid, and p-toluenesulfonic acid, may be used. In some embodiments, organic acids from the group of carboxylic acids such as acetic acid, citric acid, malic acid, formic acid, gluconic acid, lactic acid, oxalic acid, tartaric acid may be used. In some embodiments, organic acids from the group of aminopolycarboxylic acids, such as ethylenediaminetetraacetic acid (EDTA), Iminodiacetic acid (IDA), and 1,4,7,10-tetraazacyclododecane-1,4,7,10-tetraacetic acid (DOTA), may be used. In some embodiments, only part of the carboxylic groups in the organic acids may be in the protonic (acidic) form such as monosodium-, disodium-, and trisodium citrate and $Na_2H_2$EDTA.

In a specific embodiment, the complementary acid treatment step is performed at a temperature in the range of from 25° C. to 100° C., over a time period in the range of from 5 minutes to 24 hours, preferably 15 minutes to 24 hours, more preferably 15 minutes to 6 hours, wherein the aqueous solution has a solid-to-liquid ratio of 10 to 300 g per liter and the concentration of acid is in the range of 0.25 to 50 mmol per gram of alkaline-treated mesoporous zeolite obtained.

In a preferred embodiment, the solvent for the acid treatment may be water. Typical solutions to execute the acid treatment feature an overall pH varying from about pH 0, 1 or 2 to about pH 7, 8, 9 or 10, preferably from about pH 0.1, 0.2, 0.3, 0.4 or 0.5 to about pH 4.5, 5 or 5.5 and most preferably from about pH 0.3, 0.4, 0.5 or 0.6 to about pH 3.4, 4 or 4.5. The solid-to-liquid ratio (amount of solid to volume of the liquid) can vary preferably from about 1, 2, 3, 4, 5, 6, 7, 8, 9, 10, 15, 20, 25, 30, 40 or 50 g L$^{-1}$ to about 100, 110, 120, 125, 150, 200, 250, 300 or 400 g L$^{-1}$, more preferably from about 15, 20 or 25 to about 125, 150, 175, 250 g/L, and most preferably from about 150 to about 250 g/L.

The temperature may preferably range from about 10, 15, 20, 25 or 30 to about 80, 85, 90, 95 or 100° C., more preferably from about 30, 35, 40, 45 or 50° C. to about 80, 85, 90, 95 or 100° C. and most preferably from about 48, 49, 50, 51 or 52° C. to about 80, 85, 90, 95 or 100° C. The acid treatment time may preferably vary from about 0.05, 0.08, 0.09, 0.1, 0.2, 0.3, 0.5, 1, 5 or 10 to about 50, 60, 65, 70, 76 or 80 hours, more preferably from about 0.4, 0.5 or 0.6 to about 20, 21, 22, 23, 24, 25 or 26 hours, even more preferably from about 0.9, 0.95, 1, 1.05 or 1.1 to about 4, 5, 6, 7 or 8 h, most preferably from about 0.25 to about 1 hour. The concentration of acid is preferably in the range of 0.8, 0.9, 1.0, 1.1 or 1.2 to about 90, 95, 100, 105 or 110 mmol per gram of the to be treated solid, more preferably from about 0.90, 0.95, 1.0, 1.05 or 1.1 to about 48, 49, 50, 51 or 52 mmol per gram and most preferably from about 0.98, 0.99, 1.0, 1.01 or 1.02 to about 9.90, 9.95, 10.0, 10.05, 10.1 mmol per gram.

Properties of Suitable Mesoporous Zeolites

As already detailed herein above, the methods of the present invention are in particular suitable for use with mesoporous zeolites, more in particular unidirectional mesoporous zeolites having a high framework density. The method of the invention is most suitable for use with mesoporous zeolites having a framework topology selected from the list comprising any one of MTT, TON, AEL, MRE, MTW or MEL. These zeolites act similarly in dewaxing, featuring high isomerization activity. Moreover, zeolites with unidirectional framework topologies (which often display the highest framework densities) also behave in a similar fashion in post-synthetic in mesoporization treatments (see for example in CrystEngComm, 2011, 13, 3408-3416). Accordingly, this makes that the desired positive effect of the invention to occur for all of these zeolites.

Details on the framework topology, framework dimensionality, framework density, and framework micropore size in terms of member rings of suitable zeolites may also be found in the Table I.

TABLE I framework topology, framework dimensionality, framework density, and framework micropore size of different Zeolites

| Zeolite material (parent zeolite) | Framework topology | dimensionality | Framework density $(FD_{Si})$/ T atoms/nm$^3$ | Membered rings of micropore |
|---|---|---|---|---|
| ZSM-23 | MTT | 1 | 18.2 | 10 |
| ZSM-22 | TON | 1 | 18.1 | 10 |
| SAPO-11 | AEL | 1 | 19.2 | 10 |
| ZSM-48 | MRE | 1 | 19.7 | 10 |
| EU-2 | MRE | 1 | 19.7 | 10 |
| ZSM-12 | MTW | 1 | 18.2 | 12 |
| ZSM-11 | MEL | 1 | 17.4 | 10 |
| ferrierite | FER | 2 | 17.6 | 10 and/or 8 |
| ZSM-35 | FER | 2 | 17.6 | 10 and/or 8 |
| ZSM-5 | MFI | 3 | 18.4 | 10 |
| Beta (comparative) | BEA | 3 | 15.3 | 12 |
| USY (comparative) | FAU | 3 | 13.3 | 12 |

It is noted that FD$_{Si}$ relates to framework topology density in which all T-atoms (referred to as 'T') are silicon. The framework densities can be found in "Atlas of Zeolite Framework Types" Ch. Baerlocher, L. B. McCusker and D. H. Olson, Atlas of Zeolite Framework Types, 6th revised edition, Elsevier, Amsterdam, 2007.

Zeolites with 2D and 3D micropore channels (and the required high framework density), such as ZSM-5 (MFI) and ferrierite (FER), also can yield the positive catalytic effect in dewaxing of the invention. The positive impact on catalytic selectivity in dewaxing in these cases is often similar in absolute sense (gain in diesel or lube retention at fixed cloud point improvement), but can typically be smaller in relative sense, as the 2D and 3D zeolites are generally somewhat less selective to middle distillates than unidirectional zeolites.

Suitable mesoporous zeolites display framework densities preferably from about 16.0, 16.5, 17.0, 17.3, 17.6, 18.0 to about 19.0, 19.3, 19.6, 20.0, 20.5, 21 T/nm$^3$, more preferably from about 17, 17.2, 17.4, 17.6, 18.0 to about 19.0, 19.3, 19.6, to 20.0 T/nm$^3$, and most preferably from about 17.6, 17.8, 18.0 to about 18.5, 18.7, 19.0, or 19.8 T/nm$^3$. Herein 'T' refers to T atoms.

Suitable mesoporous zeolites preferably display micropore channels with 8-12 member rings, more preferably 8 to 10 member rings, and most preferably 10 member rings.

Zeolites beta and USY displaying much lower framework densities, typically behave rather different under dewaxing conditions (much less selective to isomerization), and also require much different conditions to be suitably mesoporized using post-synthetic modifications, such as base and acid leaching. Accordingly, these zeolites (and related frameworks) do not form part of the invention. In a particular embodiment, the mesoporous zeolites as used herein comprise a framework density ($FD_{Si}$) of 17 to 20 T/nm$^3$, a molar Si/Al ratio of 20 to 400, and a mesopore volume of 0.4 to 1.2 ml/g.

In another particular embodiment, the alkaline-treated mesoporous zeolite as used herein is characterized in that the volume of mesopores in the alkaline-treated mesoporous zeolite having a diameter in the range of 4 to 20 nm is in the range of 0.05 to 0.3 ml/g, wherein the volume of mesopores in the alkaline-treated mesoporous zeolite having a diameter of more than 20 nm is more than 0.2 ml/g, and wherein the ratio of mesopores having a diameter in the range of 4 to 20 nm to mesopores having a diameter of more than 20 nm is smaller than 1.0. Further details hereof may also be found in Table 2 of the examples part.

The alkaline-treated mesoporous zeolites display mesopore volumes is in the range from 0.05 ml/g to 1.20 ml/g, preferably 0.10 ml/g to 0.80 ml/g, more preferably 0.20 ml/g to 0.8 ml/g. For example, 0.06 ml/g, 0.07 ml/g, 0.08 ml/g, 0.09 ml/g, 0.10 ml/g, 0.15 ml/g, 0.20 ml/g, 0.25 ml/g, 0.30 ml/g, 0.40 ml/g, 0.50 ml/g, 0.60 ml/g, 0.70 ml/g, 0.80 ml/g, 0.90 ml/g, or 1.20 ml/g.

The alkaline-treated mesoporous zeolites display mesopores surfaces is in the range from 30 m$^2$/g to 500 m$^2$/g, preferably 60 m$^2$/g to 300 m$^2$/g, more preferably 80 m$^2$/g to 250 m$^2$/g. For example, 30 m$^2$/g, 40 m$^2$/g, 50 m$^2$/g, 60 m$^2$/g, 70 m$^2$/g, 80 m$^2$/g, 90 m$^2$/g, 100 m$^2$/g, 150 m$^2$/g, 200 m$^2$/g, 250 m$^2$/g, 300 m$^2$/g, 350 m$^2$/g, 400 m$^2$/g, 450 m$^2$/g, or 500 m$^2$/g.

The alkaline-treated mesoporous zeolites display total surfaces ($S_{BET}$) is in the range from 60 m$^2$/g to 650 m$^2$/g, preferably 120 m$^2$/g to 500 m$^2$/g, more preferably 160 m$^2$/g to 450 m$^2$/g. for example 60 m$^2$/g, 80 m$^2$/g, 100 m$^2$/g, 120 m$^2$/g, 140 m$^2$/g, 160 m$^2$/g, 180 m$^2$/g, 200 m$^2$/g, 300 m$^2$/g, 350 m$^2$/g, 400 m$^2$/g, 450 m$^2$/g, 500 m$^2$/g, 550 m$^2$/g, 600 m$^2$/g, or 650 m$^2$/g.

The alkaline-treated mesoporous zeolites display micropore volumes are in the range from 0.01 ml/g to 0.15 ml/g, preferably 0.01 ml/g to 0.12 ml/g, more preferably 0.02 ml/g to 0.09 ml/g. for example, 0.03 ml/g, 0.04 ml/g, 0.05 ml/g, 0.06 ml/g, 0.07 ml/g, 0.08 ml/g, 0.09 ml/g, 0.10 ml/g, 0.11 ml/g, 0.12 ml/g, 0.13 ml/g, 0.14 ml/g, 0.15 ml/g.

The alkaline-treated mesoporous zeolites display molar Si/Al ratios in the range from 15 to 800, preferably 20 to 200, more preferably 30 to 90. For example, 25, 35, 40, 50, 60, 80, 100, 125, 150, 175, 250, 300, 350, 400, 500, 600, 800.

In the case Mg is on the alkaline-treated mesoporous zeolite in an amount larger or equal to 0.05 wt %, the Mg content is in the range from 0.05 wt % to 13.5 wt %, preferably 0.1 wt % to 10 wt %, more preferably 1.0 wt % to 7.0 wt %. for example, 0.1 wt %, 0.3 wt %, 0.6 wt %, 1.5 wt %, 2.0 wt %, 2.5 wt %, 4.0 wt %, 5.0 wt %, 6.0 wt %, 8.0 wt %, 9.0 wt %, 10.5 wt %, 11.0 wt %, 11.5 wt %, 12.0 wt %, 12.5 wt %, 13.0 wt %.

Mg dispersion, as assessed using oxalic acid chemisorption on solids with at least 1.0 wt % of Mg, in the range from 20% to 95%, preferably 30% to 85%, more preferably 40% to 80%. For example, 25%, 35%, 70%, 75%, 90%.

In addition, alkaline-treated mesoporous zeolites in accordance with the present invention may have any of the following characteristics and combinations thereof:

A Bronsted acidity ranging from 50-500 gmol/g; in particular at least 50 gmol/g;

Presence of additives left during synthesis: such as metals: Fe, Co, Ni, Mg, in particular Mg and Ni, which may be present in the range of 0.1 wt % to 15 wt %.

A micropore volume ($V_{micro}$) in the range of from about 0.02 ml g$^{-1}$ 0.10 ml g$^{-1}$; in particular from about 0.02 ml g$^{-1}$ 0.06 ml g$^{-1}$ A mesopore volume ($V_{meso}$) in the range of from about 0.05 ml g$^{-1}$-1.2 ml g$^{-1}$; preferably in the range of from about 0.4 ml g$^{-1}$-1.2 ml g$^{-1}$; in particular from about 0.4 ml g$^{-1}$-0.8 ml g$^{-1}$ The alkaline-treated mesoporous zeolite may further be cationic (e.g. protonic). In a particular embodiment, the alkaline-treated mesoporous zeolite may be 10-99% acidic, for example 10-30%; although higher % are preferred to attain maximum activity, such as 70-99%, 80-99%, 90-99%

A high SAR, such as a framework atomic Si/Al>ca.75

A framework density of 17 to 20 T/nm$^3$

Particularly suitable alkaline-treated mesoporous zeolites according to the present invention are those having an MTT framework topology and comprising at least 300 ppm of Pt or Pd, wherein the alkaline-treated mesoporous zeolite further comprises a molar Si/Al ratio of at least 20, a mesopore volume in the range of 0.4 to 1.2 ml/g and/or external surface in the range of 100 to 350 m$^2$/g, and a Bronsted acidity as measured using pyridine of at least 50 mol/g.

Another class of particularly suitable alkaline-treated mesoporous zeolites are those featuring the MFI framework topology a molar Si/Al ratio of at least 20, a mesopore volume in the range of 0.15 to 1.2 ml/g and/or external surface in the range of 100 to 350 m$^2$/g. The latter materials preferably comprise a magnesium content in the range of 0.3 wt % to 15 wt %. When containing more than 0.3 wt % of Mg, the Mg dispersion is preferably at least 50%, as determined using oxalate chemisorption. Such Mg-containing mesoporous MFI materials are clearly distinct from other Mg-containing mesoporous MFI materials based on a higher dispersion of the magnesium and a higher relative stability of the magnesium in subsequent post-synthetic modifications, such as ion exchange and acid treatments.

When used as a dewaxing catalysts, the zeolites as defined herein above, may be combined with (noble) metals or metal oxides such as Ni, Pd or Pt, preferably in the range of 300 ppm to 2 wt %.

FIGURES

Figure 2A:
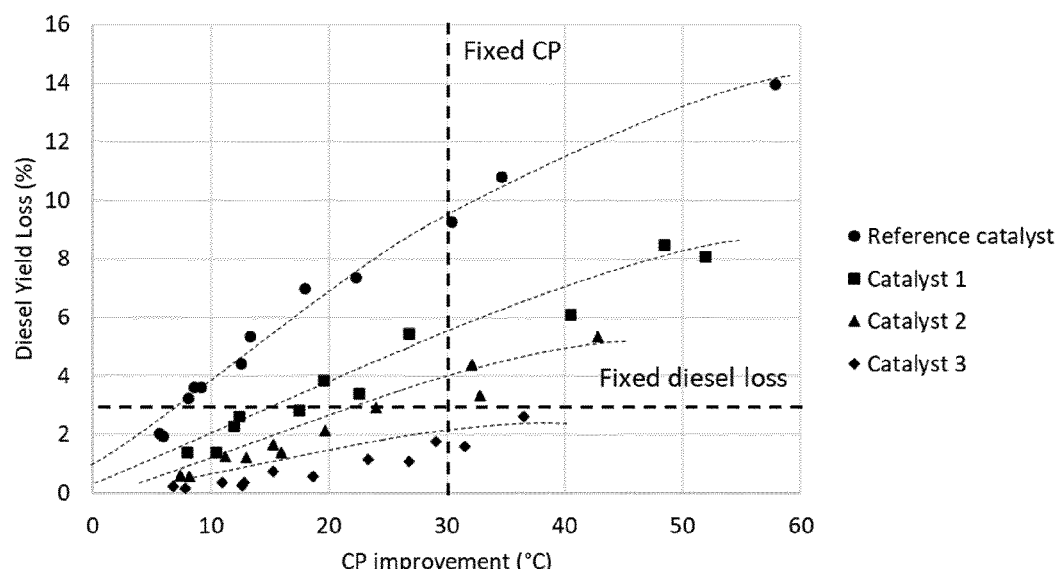
Figure 2B:
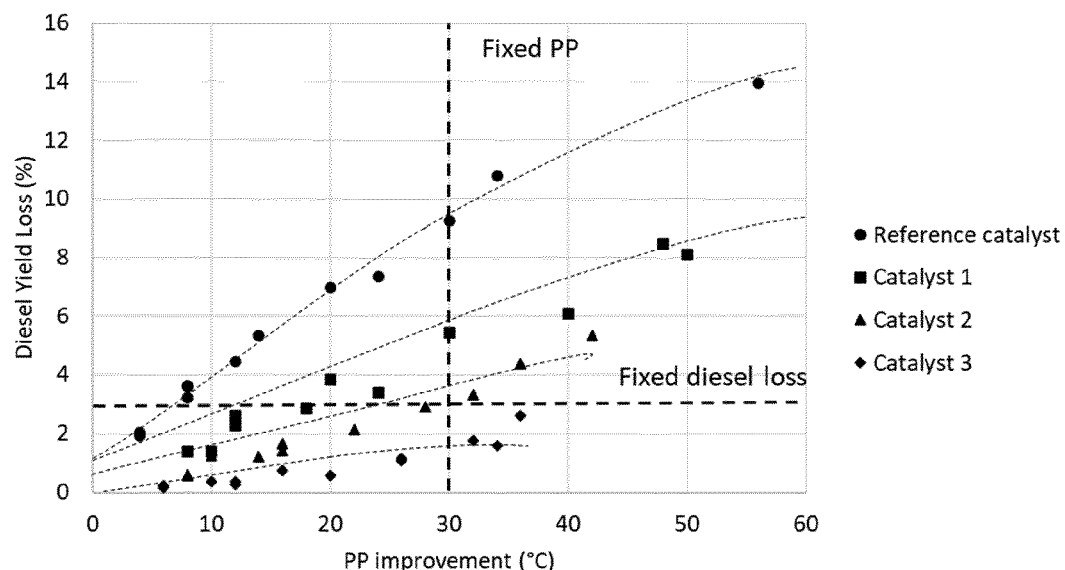
Figure 3:
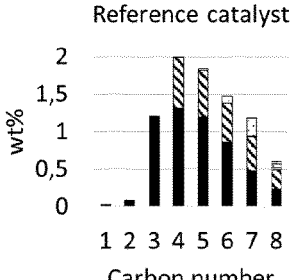
Figure 3:
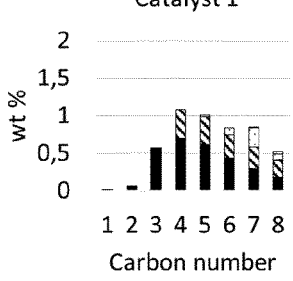
Figure 3:
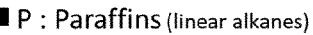
Figure 3:
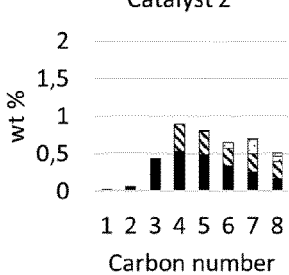
Figure 3:
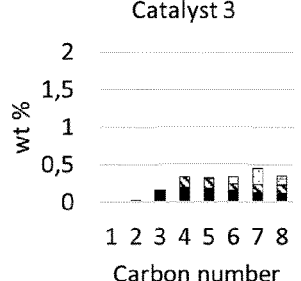
Figure 4:
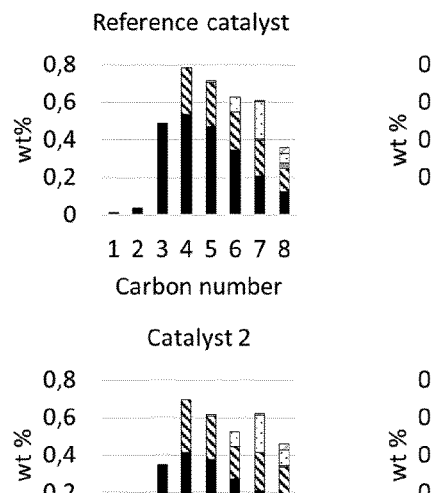
Figure 4:
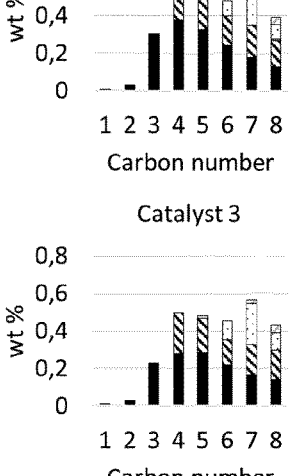
Figure 5:
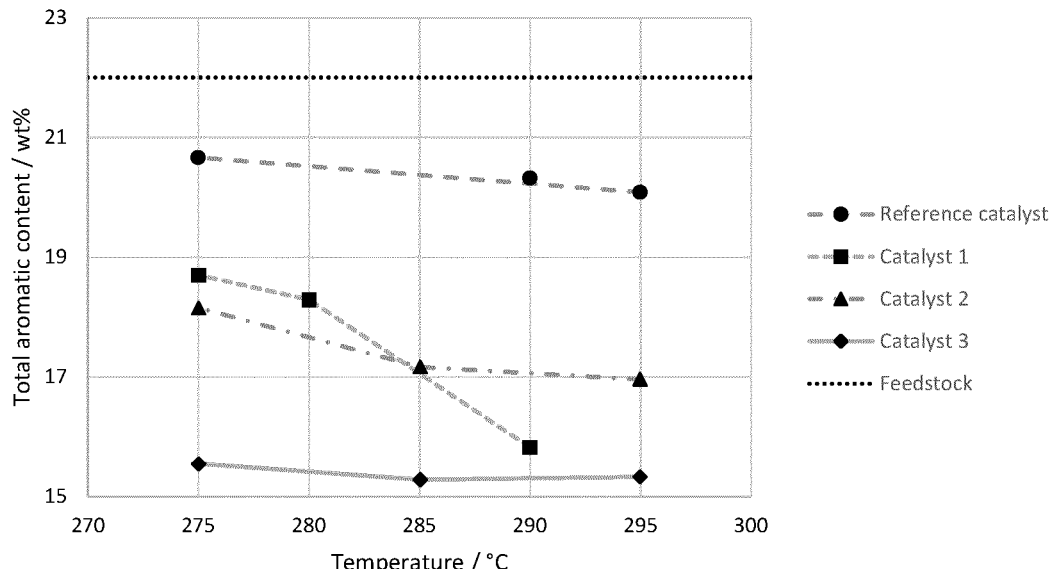
Figure 6:
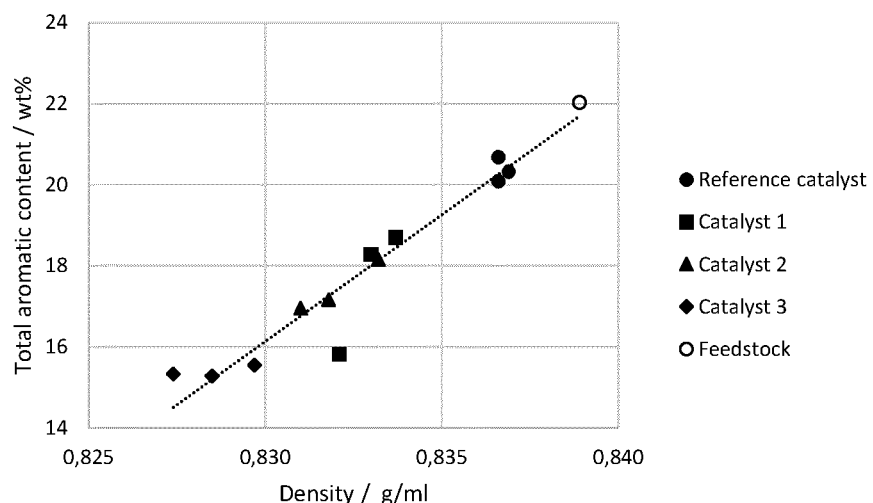
Figure 7:
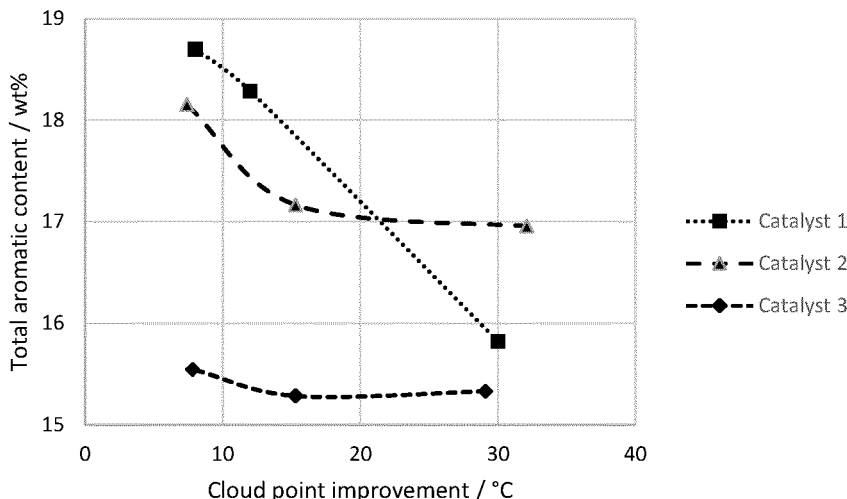

FIG. 1: BJH mesopore size distributions of the Reference (parent) Zeolite, the comparative Zeolite 1, and Zeolites 2 and 3 according to the invention;

FIG. 2: Diesel yield loss (DYL) as a function of cloud point (CP) improvement (FIG. 2A) or pour point (PP) improvement (FIG. 2B) for the Reference (parent) Catalyst, comparative Catalyst 1, and Catalysts 2 and 3 according to the invention;

FIG. 3: Distribution of the C1-C8 fraction as a function of the carbon number and type of molecule (linear alkane, branched alkane, aromatics, naphthenes, and olefins) for the Reference (parent) Catalyst, comparative Catalyst 1, and Catalysts 2 and 3 according to the invention at fixed cloud point improvement;

FIG. 4: Distribution of the C1-C8 fraction as a function of the carbon number and type of molecule (linear alkane, branched alkane, aromatics, naphthenes, and olefins) for the Reference (parent) Catalyst, comparative Catalyst 1, and Catalysts 2 and 3 according to the invention at fixed diesel loss;

FIG. 5: Total aromatic content versus reaction temperature for the product stream coming after dewaxing using the Reference (parent) Catalyst, comparative Catalyst 1, and Catalysts 2 and 3 according to the invention;

FIG. 6: Total aromatic content versus density for the product stream coming after dewaxing using the Reference (parent) Catalyst, comparative Catalyst 1, and Catalysts 2 and 3 according to the invention; and FIG. 7: Total aromatic content versus cloud point improvement for the product stream coming after dewaxing using the Reference (parent) Catalyst, comparative Catalyst 1, and Catalysts 2 and 3 according to the invention.

EXAMPLES

Methods $N_2$ Adsorption Technique

The properties of the zeolite (catalysts) may be assessed using nitrogen sorption at 77 K as it is a well-established technique to quantify the intrinsic zeotypical properties (relevant for crystalline microporous solids), as well as the secondary (meso)porosity in the solid. A descriptor that is derived from the nitrogen isotherm is the total surface area ($S_{BET}$), as it gives an indication of the overall porosity (micropores and mesopores) of the solids. The intrinsic zeotypical properties can be examined using the micropore volume ($V_{micro}$), which is derived from application of the t-plot to the adsorption branch of the isotherm. The t-plot method simultaneously yields an external surface (referred to '$S_{meso}$') which is used as an indication for the degree of secondary porosity. The total pore volume ($V_{pore}$) is used as an indicator for the overall porosity. The mesopore volume is also an indicator of the amount of generated secondary porosity, and ($V_{meso}$) is defined as $V_{meso}=V_{pore}-V_{micro}$. It is generally thought most desirable to attain solids with the highest microporosity ($V_{micro}$) and mesoporosity ($S_{meso}$, $V_{meso}$), yielding in turn the high overall porosity ($S_{BET}$, $V_{pore}$).

Pore volume for the D1 (3-4 nm), D2 (4-20 nm) and D3 (>20 nm) diameter ranges (as determined in Table 2) were calculated using the integration of the BJH Adsorption dV/dD Pore Volume curves in the specified pore size ranges (see FIG. 1). These ranges are used to further quantify the mesoporosity formed in the zeolites. BJH Adsorption dV/dD Pore Volume curves were derived from the $N_2$-isotherm using the Harkins and Jura method with Faas correction.

Acidity

Acidity measurements are instrumental as they enable to monitor the amount and type of acid sites present in the zeolite. Acidity assessment using pyridine-probed infrared spectroscopy can be executed as reported previously in WO2017148852 using a desorption temperature and time of 150° C. and 20 min, resulting in a concentration of Bronsted sites (B) and Lewis sites (L), both in gmol per gram, which can be combined to give an overall acidity (B+L) and a relatively Lewis acidity, L/(B+L).

In more detail, Pyridine FTIR measurements were performed by using a Nicolet 6700 spectrometer equipped with a DTGS detector. Samples were pressed into self-supporting wafers and degassed at 400° C. for 1 h in vacuo before measurements. Bronsted and Lewis acid sites were analysed by using a pyridine probe. After evacuation, the samples were subjected to 4-5 pulses of at least 25 mbar of pyridine at 50° C. for 1 min (until saturation), after which the system was heated to 150° C. in 20 min, followed by the acquisition of the spectra at the same temperature. The absorptions at 1550 and 1450 $cm^{-1}$ corresponded to the amount of Bronsted and Lewis acid sites, respectively. The extinction coefficients were determined by Emeis, J. Catal. 1993, 141, 347-354.

Metal Dispersion

The dispersion of non-noble metals, such as Mg and/or Ni, can be suitably assessed using chemisorption of oxalic acid. Oxalic acid displays a unique interaction with many metals, and metal dispersion can be determined by relating the amount of metal complexes (formed when contacted with oxalic acid) with the total amount of metal on the solid. The deposition of oxalic acid on the solid herein was performed in the vapour phase. Hereto, 0.5 g of solid was prepared into a sieve fraction, and was mixed with 0.5 g of oxalic acid. This mixture was placed into a metal cup, coupled to a heating gun, heated to a temperature of 200° C., and left at this temperature for 30 min. During this period, the heating of the metal parts results in the vaporization of the oxalic acid and the formation of metaloxalate species. Simultaneously, the airflow provided by the heat gun ensures that excess oxalic acid (hence those not present in a metal oxalate complex) is evacuated from the solid. The amount of metal oxalate on the solid was subsequently determined using thermogravimetric analysis (TGA). Hereto, about 5-10 mg of sample was put in a crucible and placed in a TGA apparatus. Next, an analysis was started under nitrogen atmosphere (10 ml/min) and a heating rate of 20° C./min in the temperature range of room temperature to 900° C. Next, the weight loss in the range of 275° C. to 800° C. was quantified, yielding an amount of metal oxalate complex by relation of the weight loss to that of the pure metal oxalate compound in the same range determined using the same protocol.

Mesoporous Zeolite MTT Preparation

The examples feature the synthesis of comparative and inventive zeolite treatments, which can be generally classified as follows:

Process A: Alkaline treatment in the absence of suitable salts, followed by an acid and ion exchange treatments. This is a comparative process based on the absence of suitable salts in the alkaline treatment.

Process B: Alkaline treatment in the presence of suitable salts, followed by an acid and ion exchange treatments. This is an inventive process based on the presence of suitable salts in the alkaline treatment.

Process C: Alkaline treatment in the presence of suitable salts, followed by ion exchange treatments. This is an inventive process based on the presence of suitable salts in the alkaline treatment.

A) Reference (Parent) Zeolite

The parent zeolite, featuring the MTT framework and a molar Si/Al of 43 (hence molar SAR or $Si/Al_2$ of 86), was not in an active protonic form and needed to be ion exchanged (to $NH_4$ form) and calcined (to remove $NH_3$) to yield the active protonic form:

Hereto, in Step 0, 10 g was introduced in one go in a round-bottom flask containing a stirred 1000 ml solution of a 0.05 M $(NH_4)_2SO_4$ (10 mmol $NH_4^+$ per gram of zeolite). The resulting suspension was stirred and maintained at 25° C. for 8 h. Afterwards, the suspension was transferred to a one stage deep bed cylindrical filter (filter media: SK100 d=14 cm, separation limit 7.0-18 μm), in order to separate the solid from the suspension.

Afterwards, the resulting wet zeolite was dried overnight in an oven at 100° C. This procedure was repeated an extra two times.

The dried solid obtained after the 3rd IE (ion exchange) was calcined under air at a temperature of 550° C. for 15 h with an initial heating ramp of 1.5° C./min.

B) Zeolite 1 (Comparative, Process a)

Zeolite 1 is mesoporized via base-acid treatment in the absence of inventive salts and is considered a comparative example.

33 g of the parent MTT zeolite was added to 900 ml of water which was stirred and maintained at 85° C. in a round bottom flask (forming suspension of Step 1A).

Then, in Step 1B, 100 ml of a 4 M NaOH solution was added dropwise to the suspension of Step 1A over the course of 120 min. Afterwards, in Step 1C, the suspension filtered and dried as mentioned in Step 0.

In step 1D, the dried solid obtained after Step 1C was exposed to a subsequent acid treatment. Hereto, 20 g of the dried solid obtained after Step 1C was introduced in one go in a round-bottom flask containing a stirred 2000 ml solution of a 0.1 M HCl (10 mmol HCl per gram of alkaline-treated mesoporous zeolite). The resulting suspension was stirred and maintained at 65° C. for 6 h. Afterwards, the solid was separated using the above described filtration, dried overnight in an oven at 100° C.

Zeolite sample was then ion exchanged and calcined following the above described procedure for the reference material.

C) Zeolite 2 (According to the Invention, Process B)

50 mmol of magnesium nitrate (salt) was added in one go to 900 ml of water, which was stirred and maintained at 85° C. in a round-bottom flask. Next, within several minutes, 33 g of the parent MTT zeolite was added to the solution, stirred, and maintained at 85° C. for about 5 minutes (forming suspension of step 2A).

Then, in Step 2B, 100 ml of a 4 M NaOH solution was added dropwise to the suspension of Step 2A over the course of 60 min. Afterwards, in Step 2C, the suspension was filtered and dried as mentioned in Step 0. The molar metal(Mg)-to-aluminium ratio in the obtained alkaline-treated solid was 2.3 mol/mol. Then, an additional subsequent acid treatment was performed as described in Step 1D.

Zeolite sample was then ion exchanged and calcined following the above described procedure for the reference material.

D) Zeolite 3 (According to the Invention, Process C)

Preparation of Zeolite 3 is similar to Zeolite 2, with the exception that after the base contacting in Step 2B, no subsequent acid treatment was performed. The resulting material featured a significant amount of magnesium. This is unique to the invention as metals deposited used other metal deposition technologies (such as IWI or ion exchange) would have been completely washed out during the 3-step ion exchange.

E) Zeolite 4 (According to the Invention, Process B)

Preparation of Zeolite 4 is similar to Zeolite 2, with the exception that 2.5 mmol HCl per g of alkaline-treated mesoporous zeolite was used instead of 10 mmol HCl per g of alkaline-treated mesoporous zeolite.

F) Zeolite 5 (According to the Invention, Process B)

Preparation of Zeolite 5 is similar to Zeolite 2, with the exception that the alkaline treatment was performed in a fixed-bed configuration, with the parent MTT zeolite present as a cake/membrane through which the alkaline solution was fed. To this end, the zeolite was first formed into a cake membrane by slurrying the 33 g of parent ZSM-23 in one liter of demi-water and filtering this suspension on a Buchner filtration set-up, of which the upper filtration cup had cylindrical shape, a volume of about 300 ml, and a diameter of about 12 cm, resulting in an average (wet) filter cake thickness of about 10-20 mm. Subsequently, 1 L of a preheated and stirred suspension of 50 mmol of Mg(NO₃)₂ in 400 mmol of NaOH was gradually dripped over the cake over a period of 75 minutes. After the alkaline treatment was completed, the solid was washed and dried as mentioned for Zeolite 2. The resulting material featured, like Zeolite 2, increased mesoporosity over the parent zeolite and no significant amounts of Mg.

Mesoporous Zeolite MTT Properties

Table 1 and 2 provide the properties of the reference (parent) zeolite and Zeolite 1-5, as well as details on the used mesoporization process.

TABLE 1

| Entry | Type | Process for mesopor. | SAR[a] | SBET[b] m2·g−1 | Smeso[c], m2·g−1 | Vmicro[d], ml·g−1 | Vmeso[e], ml·g−1 |
|---|---|---|---|---|---|---|---|
| Reference zeolite | Parent | None | 86 | 172 | 57 | 0.06 | 0.33 |
| Zeolite 1 | Mesoporous | Process A | 94 | 281 | 162 | 0.06 | 0.68 |
| Zeolite 2 | Mesoporous | Process B | 104 | 275 | 177 | 0.05 | 0.79 |
| Zeolite 3 | Mesoporous | Process C | 52 | 281 | 173 | 0.02 | 0.74 |
| Zeolite 4 | Mesoporous | Process B | 48 | 231 | 160 | 0.04 | 0.65 |
| Zeolite 5 | Mesoporous | Process B | 91 | 262 | 111 | 0.08 | 0.47 |

[a]Molar silica to Alumina ratio measured by elemental analysis: ICP (Inductively Coupled Plasma)

[b]BET (total) surface area measured by N2-physisorption using the BET model

[c]Mesopore surface area measured by N2-physisorption using the t-plot model

[d]Micropore volume measured by N2-Physisorption using the t-plot model

[e]Vpore-Vmicro

TABLE 2

| Entry | Type | Process for mesopor. | Mesopores D1 30-40 A/ml/g | Mesopores D2 40-200 A/ml/g | Mesopores D3 >200 A ml/g | D2/D3 |
|---|---|---|---|---|---|---|
| Reference zeolite | Parent | None | 0.000 | 0.029 | 0.127 | 0.228 |
| Zeolite 1 | Mesoporous | Process A | 0.010 | 0.091 | 0.309 | 0.294 |
| Zeolite 2 | Mesoporous | Process B | 0.009 | 0.113 | 0.417 | 0.271 |
| Zeolite 3 | Mesoporous | Process C | 0.013 | 0.143 | 0.426 | 0.336 |

$N_2$-Physisorption was used to determine isotherm, adsorption and desorption properties of the zeolites used herein. The data (FIG. 1) revealed that the type of mesoporosity was largely similar between the 3 displayed mesoporous samples, while varying mesopore size distribution between the different mesoporous zeolites was observed. These size distributions can be used to define a specific type of mesopore volume. Table 2 evidences a large porosity increase in each of D1, D2 and D3 for the zeolites of the present invention compared to the reference zeolite, without a significant change in the ratio of D2/D3. The similarity between the porosity and composition of Zeolite 1 and Zeolite 2 is emphasized.

The treated zeolites 1-5 comprised, like the parent reference zeolite, the MTT framework as could be discerned using powder X-ray diffraction.

Preparation of MTT Catalysts 1-4 (Metal Containing Sieve Fraction)

The mesoporous zeolites as defined herein were subsequently used to prepare catalysts using the below defined process:

Step 1: zeolites were tableted under 28 ton to produce 40 mm pellets

Step 2: pellets were sieved to 315-500 μm sieve fraction

Step 3: the sieve fraction was dried at 450° C. in air for 1-3 hours

Step 4: the dried sieve fraction was impregnated with 90% soaking volume by dropwise addition at room temperature for 60-120 min with agitation, with a target of 1 wt % Pt Step 5: the impregnated sieve fraction was dried at 80° C. for 15 h Step 6: the dried sieve fraction of step 5 was calcinated at 190° C. (ramp 5° C./min, 1 h hold) under air flow Step 7: the fraction of step 6 was calcinated ate 300° C. (ramp 5-10° C./min, 5 h hold) under air flow Step 8: the fraction of step 8 was cooled down to room temperature In further detail step 4 of the above process was performed using the following:

Impregnation solution consisted of x mmol of tetraammineplatinum(II) nitrate solubilized in a pH 10 buffer solution containing 0.1 M ammonia and 0.02 M ammonium nitrate.

The x mmol amount tetraammineplatinum(II) nitrate is dependent on the targeted Pt amount and the water soaking volume of the sieve fraction.

Preparation of MTT Catalysts 5-7 (Metal Containing Sieve Fraction)

Catalyst 5 was prepared following the same procedure as for Catalyst 1-4 with the exception that a targeted amount of 0.3 wt % Pt was used instead of 1 wt % Pt in Step 4.

Catalysts 6 and 7 were prepared following the same procedure as for Catalyst 1-4 with the exception that tetraaminepalladium(II) nitrate was used instead of tetraammineplatinum(II) nitrate.

Preparation of MTT Catalysts 8 and 9 (Metal Containing Extrudates)

Catalysts 8 and 9 were prepared following the same procedure as for Catalysts 1-4 with the exception that, the zeolite powder was first extruded with an alumina binder (Catapal B) in a 50/50 weight ratio to form cylindrical extrudates (diameter 0.9 mm, length 3-4 mm), Steps 1 and 2 were not performed, and Step 3 was performed at 550° C. instead for 450° C.

MTT Catalyst Properties

Table 3 provides the properties of the several catalysts as used herein. Reference catalyst is derived from the Reference (parent) zeolite, while catalysts 1, 2, 3, and 4 were derived from zeolites 1, 2, 3, and 4, respectively. Reference Catalysts 6 and 8 are made from the Reference (parent) Zeolite, whereas Catalysts 5, 7 and 9 are made from Zeolite 3.

TABLE 3

| Entry | Zeolite sample | Type | Mg content[h], Wt % | Pt content[j], Wt % | Acidity pyridine[k], μmol · g − 1 |
|---|---|---|---|---|---|
| Reference Catalyst | Reference zeolite | Parent | 0.01 | 0.75 | 346 |
| Catalyst 1 | Zeolite 1 | Mesoporous (comparative) | 0.02 | 0.63 | 247 |
| Catalyst 2 | Zeolite 2 | Mesoporous | 0.02 | 0.82 | 281 |
| Catalyst 3 | Zeolite 3 | Mesoporous | 4.40 | 0.72 | 92 |
| Catalyst 4 | Zeolite 4 | Mesoporous | 1.11 | 0.96 | na |
| Catalyst 5 | Zeolite 3 | Mesoporous | 3.13 | 0.30 | na |
| Reference Catalyst 6 | Reference zeolite | Parent | 0.01 | 0.71 (Pd)[l] | na |
| Catalyst 7 | Zeolite 3 | Mesoporous | 3.15 | 0.71 (Pd)[l] | na |
| Reference Catalyst 8 | Reference zeolite | Parent extrudate | 0.05 | 1.00 | na |

TABLE 3-continued

| Entry | Zeolite sample | Type | Mg content[h], Wt % | Pt content[j], Wt % | Acidity pyridine[k], μmol · g − 1 |
|---|---|---|---|---|---|
| Catalyst 9 | Zeolite 3 | Mesoporous extrudate | 1.68 | 0.93 | na |

[h]Magnesium content measured by ICP
[j]Pt content measured by ICP
[k]Total acidity measured using pyridine-probed FTIR (Fourier Transform InfraRed spectroscopy)
[l]Pd was used as hydrogenation metal instead of Pt.

From Table 3 it is evident that the catalysts of the invention contain sufficient Pt (or Pd), which ensures that the metal function for hydrogenation is not limiting. Catalyst 3 contains a large amount of Mg compared to the other catalysts, as well as limited (accessible) micropores and a low acidity.

Hydrocarbon Feedstock Used for the Catalytic Test

Table 4 provides the properties of the hydrocarbon feedstock used in the below experiments:

TABLE 4

| Feed properties | |
|---|---|
| Sulfur, ppm (ASTM D5453) | 13 |
| Nitrogen, ppm (ASTM D4629) | 0.9 |
| Cloud Point, ° C. (ASTM D7689) | −5 |
| Pour Point, ° C. (ASTM D7346) | −8 |
| Density, g/ml (ASTM D4052) | 0.8389 |
| API Gravity (ASTM D4052) | 37.17 |
| Kinematic viscosity at 30° C., mm2 · s − 1 (ASTM D7042) | 4.76 |
| Naphtha (IBP-150° C.), wt % (ASTM D7213) | 1.4 |
| Diesel (150° C.-370° C.), wt % (ASTM D7213) | 93.8 |
| Lube (370 + ° C.), wt % (ASTM D7213) | 4.8 |

| SimDist (ASTM D7213) | ° C. |
|---|---|
| 0.5% | 113 |
| 5% | 195 |
| 10% | 221 |
| 20% | 254 |
| 30% | 274 |
| 40% | 290 |
| 50% | 303 |
| 60% | 313 |
| 70% | 323 |
| 80% | 336 |
| 90% | 355 |
| 95% | 369 |
| 99% | 400 |
| 99.5% | 412 |

SimDist refers to simulated distillation which is the industry standard method to characterize feeds in refining.

Catalytic Tests on MTT Zeolites

The conditions of the catalytic tests used herein were as follows:

LHSV (liquid hourly space velocity, space times): 0.9 and 1.8 h$^{-1}$

Temperatures: 270-315° C.

Pressure: 30 bar (total pressure)

Hydrogen treat gas rate: 300 NI/1

Catalytic Tests on MTT Zeolites

As evident from FIG. 2, both the Cloud Point (CP) and Pour Point (PP) improved with at least a factor 4 for the catalysts of the invention compared to the reference catalyst, indicating that mesoporisation has a significant impact on these parameters. Moreover, the order of best performing catalysts is as follows: Catalyst 3>Catalyst 2>Catalyst 1; indicating that the mesoporization sequence in the presence of salts (Process B/Catalyst 2 and Process C/Catalyst 3) yields a much superior dewaxing compared to the mesoporization sequence in the absence of the salts (Process A/Catalyst 1). Since also in the state of the art (Catalysis Today, Volumes 218-219, December 2013, Pages 135-142) base-acid mesoporization sequences have thus far been only executed in the absence of salts (like Process A/Catalyst 1), the salt-containing mesoporization Process B and Process C enable a significantly improved dewaxing performance over the state of the art. Moreover, the superior performance of Catalyst 2 over Catalyst 1 is surprising as the properties of catalysts and related alkaline-treated mesoporous zeolites were largely similar.

Next, as Catalyst 3 is superior over Catalyst 2, it proves that the presence of the salt (Mg in this case) on the alkaline-treated mesoporous zeolite can be of high value to yield an optimal dewaxing performance.

Further experimental details for these catalysts at a fixed cloud point improvement of 30° C. (vertical line in FIG. 2), can be found in Table 5.

TABLE 5

| | Feed | Reference catalyst | Catalyst 1 | Catalyst 2 | Catalyst 3 |
|---|---|---|---|---|---|
| Temperature, ° C. | | 295 | 290 | 295 | 295 |
| LHSV, hr − 1 | | 1.8 | 1.8 | 1.8 | 1.8 |
| Pressure, barg | | 30 | 30 | 30 | 30 |
| Cloud point improvement, ° C. | | 30 | 27 | 32 | 29 |
| Pour point improvement, ° C. | | 30 | 30 | 36 | 32 |
| Density, g/ml | 0.8389 | 0.8366 | 0.8321 | 0.831 | 0.8274 |
| API gravity | 37.17 | 37.64 | 38.55 | 38.78 | 39.52 |
| Kinematic viscosity at 30° C., mm2 · s − 1 | 4.76 | 4.33 | 4.41 | 4.45 | 4.46 |
| Diesel Yield Loss, % | — | 9.3 | 5.4 | 4.4 | 1.8 |

Processing conditions and results

TABLE 5-continued

| | | Reference | | | |
|---|---|---|---|---|---|
| | Feed | catalyst | Catalyst 1 | Catalyst 2 | Catalyst 3 |
| Processing conditions and results | | | | | |
| Naphtha (IBP-150° C.), wt % | 1.4 | 8.2 | 6.0 | 5.4 | 3.6 |
| Diesel (150° C.-370° C.), wt % | 93.8 | 84.6 | 88.4 | 89.4 | 92.0 |
| Lube (370 + ° C.), wt % | 4.8 | 4.0 | 4.0 | 3.8 | 3.8 |
| C1-C4, wt % | | 3.3 | 1.7 | 1.4 | 0.5 |
| C5-C8, wt % | | 3.3 | 1.7 | 1.4 | 0.5 |
| Average carbon number in total C1-C8, a.u. | | 5.1 | 5.3 | 5.4 | 5.8 |
| Paraffinicity C4-C8, % | | 57.5 | 51.6 | 50.1 | 43.3 |

Paraffinicity C4-C8, is the percentage of paraffin (linear alkanes) vs the total hydrocarbon amount of C4-C8.

As evident from Table 5, at fixed cloud point improvement (30° C.), the catalysts of the present invention showed lower diesel yield loss (which is highly desirable), and a lower liquid density (i.e. higher API gravity).

FIG. 3 and Table 5 show a comparison of the composition of the $C_1$ to $C_8$ fraction of the different catalysts at similar cloud point improvement. The catalysts in accordance with the present invention produce less small carbon numbers, compared to the reference catalyst. In particular, the catalysts of the present invention (Catalyst 2 and Catalyst 3) yield higher average carbon numbers and a lower degree of paraffinicity (hence more branching).

Further experimental details for these catalysts at a similar diesel yield (horizontal line in FIG. 2), can be found in Tables 6 and 7.

TABLE 6

| | | Reference | | | |
|---|---|---|---|---|---|
| | Feed | catalyst | Catalyst 1 | Catalyst 2 | Catalyst 3 |
| Processing conditions and results | | | | | |
| Temperature, ° C. | | 270 | 270 | 280 | 290 |
| LHSV, hr − 1 | | 0.9 | 0.9 | 0.9 | 0.9 |
| Pressure, barg | | 30 | 30 | 30 | 30 |
| Cloud point improvement, ° C. | | 9 | 18 | 33 | 37 |
| Pour point improvement, ° C. | | 8 | 18 | 32 | 36 |
| Density, g/ml | 0.8389 | 0.8349 | 0.8303 | 0.8293 | 0.8267 |
| API gravity | 37.17 | 37.98 | 38.92 | 39.13 | 39.66 |
| Kinematic viscosity at 30° C., mm2 · s − 1 | 4.76 | 4.70 | 4.53 | 4.51 | 4.35 |
| Diesel Yield Loss, % | — | 3.6 | 2.8 | 3.3 | 2.6 |
| Naphtha (IBP-150° C.), wt % | 1.4 | 4.4 | 4.2 | 4.7 | 4.4 |
| Diesel (150° C.-370° C.), wt % | 93.8 | 90.2 | 91.0 | 90.5 | 91.2 |
| Lube (370 + ° C.), wt % | 4.8 | 4.1 | 3.9 | 3.8 | 3.6 |

TABLE 7

| | | Reference | |
|---|---|---|---|
| | Feed | catalyst | Catalyst 3 |
| Product quality at 3 wt % Diesel yield loss | | | |
| Cloud Point, ° C. | −5 | −14 | −42 |
| Pour Point, ° C. | −8 | −16 | −44 |
| Density, g/ml | 0.8389 | 0.8349 | 0.8267 |
| API Gravity | 37.17 | 37.98 | 39.66 |
| Kinematic viscosity at 30° C., mm2 · s − 1 | 4.76 | 4.70 | 4.35 |
| Naphtha (IBP-150° C.), wt % | 1.4 | 4.4 | 4.4 |
| Diesel (150° C.-370° C.), wt % | 93.8 | 90.2 | 91.2 |
| Lube (370 + ° C.), wt % | 4.8 | 4.1 | 3.6 |

TABLE 7-continued

| | | | |
|---|---|---|---|
| Product quality at 3 wt % Diesel yield loss | | | |
| Simdist | | ° C. | |
| 0.5% | 113 | 102 | 102 |
| 5% | 195 | 186 | 180 |
| 10% | 221 | 215 | 208 |
| 20% | 254 | 248 | 240 |
| 30% | 274 | 270 | 264 |
| 40% | 290 | 288 | 281 |
| 50% | 303 | 300 | 296 |
| 60% | 313 | 310 | 306 |
| 70% | 323 | 321 | 318 |
| 80% | 336 | 334 | 331 |
| 90% | 355 | 353 | 350 |
| 95% | 369 | 367 | 364 |

TABLE 7-continued

| | | | |
|---|---|---|---|
| Product quality at 3 wt % Diesel yield loss | | | |
| 99% | 400 | 397 | 394 |
| 99.5% | 412 | 410 | 407 |

These data evidence that at fixed diesel yield loss (horizontal line in FIG. 2), catalysts of the present invention enable a much better product specification, higher Cloud Point and Pour Point improvement and a lower density. This density can be suitable related to the degree of aromatics in the feed and product streams (FIGS. 5 and 6). The aromatic content of the liquid samples is measured by High Performance Liquid Chromatography Method with Refractive Index Detection according to ASTM D6591. FIGS. 5 and 6 show that, using the inventive Catalyst 2 and 3, much lower aromatics levels can be attained. Moreover, the aromatic content (hence density) is much less sensitive to temperature, enabling to yield a desired density/aromatics level at any cloud point improvement (FIG. 7), being of clear commercial value.

FIG. 4 and Table 8 show a comparison of the $C_1$-$C_8$ composition of the different catalysts at similar diesel yield loss. The catalysts in accordance with the present invention produce less small carbon numbers, compared to the reference catalyst. In particular, the catalysts of the present invention yield higher average carbon numbers and a lower degree of paraffinicity.

TABLE 8

Processing conditions and results

|  | Reference catalyst | Catalyst 1 | Catalyst 2 | Catalyst 3 |
|---|---|---|---|---|
| Temperature, ° C. | 270 | 270 | 280 | 290 |
| LHSV, hr – 1 | 0.9 | 0.9 | 0.9 | 0.9 |
| Pressure, barg | 30 | 30 | 30 | 30 |
| Diesel Yield Loss, % | 3.6 | 2.8 | 3.3 | 2.6 |
| Average carbon number in C1-C8, a.u. | 5.3 | 5.5 | 5.5 | 5.7 |
| C1-C4, wt % | 1.3 | 0.9 | 1.1 | 0.8 |
| C5-C8, wt % | 2.3 | 2.0 | 2.2 | 1.9 |
| Paraffinicity C4-C8, % | 54.2 | 49.6 | 48.5 | 45.0 |

Paraffinicity C4-C8, is the percentage of paraffin (linear alkanes) vs the total hydrocarbon amount of C4-C8.

Tables A, B, and C demonstrates that when the Mg content (Catalyst 4), or the amount hydrogenation metal (Catalyst 5), or the type of hydrogenation metal (Catalysts 6 and 7) is varied, or when the alkaline-treated mesoporous zeolites are present in an extrudate (Catalysts 8 and 9), the superior performance (that is, much lower diesel yield loss at fixed cloud point improvement) is maintained for the inventive catalysts.

TABLE A

Processing conditions and results

|  | Reference catalyst | Catalyst 4 | Catalyst 5 |
|---|---|---|---|
| Temperature, ° C. | 290 | 305 | 315 |
| LHSV, hr – 1 | 1.8 | 1.8 | 1.8 |
| Pressure, barg | 30 | 30 | 30 |
| Cloud point improvement, ° C. | 18 | 18 | 20 |
| Pour point improvement, ° C. | 20 | 20 | 24 |
| Diesel Yield Loss, % | 7 | 1.4 | 2.5 |

TABLE B

Processing conditions and results

|  | Reference Catalyst 6 | Catalyst 7 |
|---|---|---|
| Temperature, ° C. | 295 | 295 |
| LHSV, hr – 1 | 1.8 | 1.8 |
| Pressure, barg | 30 | 30 |
| Cloud point improvement, ° C. | 13.6 | 11.2 |
| Pour point improvement, ° C. | 14 | 12 |
| Diesel Yield Loss, % | 7.9 | 1.7 |

TABLE C

Processing conditions and results

|  | Reference Catalyst 8 | Catalyst 9 |
|---|---|---|
| Temperature, ° C. | 280 | 295 |
| LHSV, hr – 1 | 1.8 | 1.8 |
| Pressure, barg | 30 | 30 |
| Cloud point improvement, ° C. | 28.1 | 25.8 |
| Pour point improvement, ° C. | 28 | 26 |
| Diesel Yield Loss, % | 5.6 | 2.2 |

Mesoporous Zeolite MFI Preparation

To illustrate that the invention is also effective for the MFI framework, a parent ZSM-5 zeolite, featuring a molar Si/Al of 40 (hence molar SAR or Si/Al$_2$ of 80), was used to make a Reference Zeolite A and two derived mesoporous variants Zeolite A1 and A2.

Reference Zeolite a (Parent)

The parent zeolite was not in an active protonic form and needed to be calcined following the above described procedure for the Reference (MTT) Zeolite.

Zeolite A1 (Comparative, Process a)

The mesoporous ZSM-5 Zeolite A1 was prepared according to process A in the same manner as for Zeolite 1 with the exception that:

ZSM-5 parent zeolite was used instead of the MTT parent, during the alkaline treatment 67 g of zeolite instead of 33 g were added to the 900 ml of water which was stirred and maintained at 65° C. in a round bottom flask, then 100 mL of 5 M NaOH solution was added dropwise to the suspension over the course of 30 min. All the other parameters and/or steps are the same as described in Zeolite 1 preparation. Zeolite A1 is a comparative example.

Zeolite A2 (According to the Invention, Process C)

The mesoporous ZSM-5 Zeolite A2 was prepared according to process C in the following manner:

200 mmol of magnesium nitrate (salt) was added in one go to 900 ml of water, which was stirred and maintained at 65° C. in a round-bottom flask. Next, within several minutes, 67 g of the zeolite was added to the solution, stirred, and maintained at 65° C. for about 5 minutes (forming Suspension A).

Then, 100 ml of a 6 M NaOH solution was added dropwise to Suspension A over the course of 30 min. Afterwards, the suspension filtered, and dried like for Zeolite 3.

The obtained solid was then ion exchanged and calcined following the above described procedure for the Reference Zeolite, with the exception that 2.5 mmol of $(NH_4)_2CO_3$ per gram of zeolite was used for the first IE step, 5 mmol of $(NH_4)_2CO_3$ per gram of zeolite was used for the second IE step and 5 mmol of $(NH_4)_2SO_4$ per gram of zeolite was used for the third IE step, and for each IE steps the reaction time was 1 h.

Mesoporous Zeolite MFI Properties

The properties of the parent (Reference Zeolite A) and mesoporous ZSM-5 (Zeolite A1 and A2) zeolites are summarized in Table D, displaying increased mesopore surfaces and volumes combined with the largely preserved micropore volume and total surface area.

The magnesium dispersion on Zeolite A2 was 73% as assessed using oxalic acid chemisorption. In contrast, when Zeolite A1 was complemented with 3.9 wt % of Mg, using incipient wetness impregnation using a solution of Mg $(NO_3)_2$, a dispersion of merely 14% was obtained, highlighting the advantage of alkaline-induced metal deposition over established metal deposition methods.

33 34

TABLE D

| Entry | Type | Process for mesopor. | SAR[a] | SBETb m2 · g − 1 | Smeso[c], m2 · g − 1 | Vmicro[d], ml · g − 1 | Vmeso[e], ml · g − 1 |
|---|---|---|---|---|---|---|---|
| Reference zeolite A | Parent | None | 82 | 386 | 144 | 0.12 | 0.12 |
| Zeolite A1 | Mesoporous | Process A | 87 | 454 | 244 | 0.11 | 0.43 |
| Zeolite A2 | Mesoporous | Process C | 70 | 417 | 233 | 0.09 | 0.37 |

Catalytic Tests on MFI Zeolites

The feedstock and catalytic conditions in the below described tests on MFI, TON, MRE, and MEL frameworks were similar was used for the MTT zeolite.

All ZSM-5 samples were processed into catalyst following the same procedure as Catalysts 1-4, yielding the below properties (Table E), showing a successful incorporation of Pt and the presence of ca 4 wt % of Mg in Catalyst A2.

The catalyst results (Table F) show that mesoporization Process A, hence in the absence of additives during the base step, in line with published work (*Catal. Sci. Technol.*, 2016, 6, 6177-6186), yielded only a marginal reduction in diesel yield loss at a fixed cloud point improvement. Surprisingly, using the inventive process C and resulting catalyst, a similar cloud point improvement was combined at a much-reduced diesel yield loss and much reduced temperature.

TABLE E

| Entry | Zeolite sample | Type | Mg content, Wt % | Pt content, Wt % |
|---|---|---|---|---|
| Reference Catalyst A | Reference zeolite A | Parent | 0.02 | 0.96 |
| Catalyst A1 | Zeolite A1 | Mesoporous | 0.01 | 0.89 |
| Catalyst A2 | Zeolite A2 | Mesoporous | 3.98 | 0.94 |

TABLE F

| Processing conditions and results | | | |
|---|---|---|---|
| | Reference catalyst A | Catalyst A1 | Catalyst A2 |
| Temperature, ° C. | 295 | 290 | 270 |
| LHSV, hr − 1 | 1.8 | 1.8 | 1.8 |
| Pressure, barg | 30 | 30 | 30 |
| Cloud point improvement, ° C. | 27.7 | 29.1 | 28.5 |

TABLE F-continued

| Processing conditions and results | | | |
|---|---|---|---|
| | Reference catalyst A | Catalyst A1 | Catalyst A2 |
| Pour point improvement, ° C. | 30 | 28 | 25 |
| Diesel Yield Loss, % | 17.3 | 16.5 | 12.3 |

Catalytic Tests on TON, MRE, and MEL Zeolites

The effectiveness of the invention was also demonstrated by application of the synthetic approaches as presented for Zeolite 3 or Zeolite A2 to different parent zeolites with frameworks TON (Reference Zeolite B and Zeolite B1), MRE (Reference Zeolite C and Zeolite C1), and MEL (Reference Zeolite D and Zeolite D1, Tables G and H). Adjustments were applied in terms of the used amounts of NaOH and Mg(NO₃)₂. In all cases, the parent zeolite was in the protonic form and the catalyst making was done as for Catalysts 1-5.

The catalytic results, shown in ranges for clarity, prove that the inventive superior catalytic effect (a substantially lower diesel yield loss (DYL) over the cloud point improvement (CPI), that is, 'DYL/CPI' at ca. 30° C. CPI) is obtained in the same order of magnitude (that is, a DYL/CPI reduction larger than 0.1) for different zeolite frameworks over a broad range of Si/Al ratios, mesopore volumes, and Mg contents.

TABLE G

| Range classification in Table H | Si/Al/ mol/mol | V$_{meso}$/ml/g | DYL/CPI/ wt %/C | Mg in solid/ wt % |
|---|---|---|---|---|
| -- | 20-39 | 0.05-0.14 | 0.00-0.09 | 0.0-0.9 |
| - | 40-79 | 0.15-0.24 | 0.10-0.19 | 1.0-2.4 |
| +/- | 80-119 | 0.25-0.39 | 0.20-0.34 | 2.4-3.9 |
| + | 120-199 | 0.40-0.79 | 0.35-0.49 | 4.0-5.9 |
| ++ | 200-400 | 0.80-1.20 | 0.50-0.70 | 6.0-12.0 |

TABLE H

| Sample | Framework | Mesoporization Process | NaOH/ mmol | Mg(NO₃)₂/ mmol | Si/Al/ mol/mol | Mg in solid/ wt % | V$_{meso}$/ ml/g | DYL/CPI/ wt %/° C. |
|---|---|---|---|---|---|---|---|---|
| | | | | | | (described as ranges, see Table G) | | |
| Reference Zeolite | MTT | None | None | None | – | None | +/- | +/- |
| Zeolite 3 | MTT | Zeolite 3 | 400 | 50 | -- | +/- | + | -- |
| Reference Zeolite A | MFI | None | None | None | – | None | -- | ++ |
| Zeolite A2 | MFI | Zeolite A2 | 600 | 200 | -- | + | +/- | + |
| Reference Zeolite B | TON | None | None | None | – | None | +/- | +/- |
| Zeolite B1 | TON | Zeolite 3 | 400 | 50 | – | – | + | – |
| Reference Zeolite C | MRE | None | None | None | ++ | None | – | +/- |

TABLE H-continued

| Sample | Framework | Mesoporization Process | NaOH/ mmol | Mg(NO$_3$)$_2$/ mmol | Si/Al/ mol/mol | Mg in solid/ wt % | V$_{meso}$/ ml/g | DYL/CPI/ wt %/° C. |
|--------|-----------|------------------------|------------|----------------------|----------------|-------------------|------------------|--------------------|
| | | | | | (described as ranges, see Table G) | | | |
| Zeolite C1 | MRE | Zeolite 3 | 1000 | 300 | + | + | + | -- |
| Reference Zeolite D | MEL | None | None | None | +/- | None | +/- | + |
| Zeolite D1 | MEL | Zeolite A2 | 800 | 250 | -- | ++ | ++ | - |

The invention claimed is:

1. A method for dewaxing a hydrocarbon feedstock under dewaxing conditions, comprising the steps of:

providing a hydrocarbon feedstock to a reactor;

providing a catalyst to the reactor, and contacting the hydrocarbon feedstock with the catalyst, wherein the catalyst comprises at least 300 ppm of platinum or palladium and an alkaline-treated mesoporous zeolite, wherein the alkaline-treated mesoporous zeolite has a magnesium content in the range of 0.3 wt % to 10 wt %, a framework density (FD$_{si}$) of 17 to 20 T/nm$^3$ of MTT, TON, MRE, MFI or MEL, and a mesopore volume of 0.4 to 1.2 ml/g, and wherein the alkaline-treated mesoporous zeolite is prepared by an alkaline treatment comprising the steps of:

providing a parent zeolite to an aqueous solution, wherein the aqueous solution has a pH of at most 8, and comprises at least a magnesium salt;

adding a base to the reaction mixture, wherein the pH of the aqueous reaction mixture is increased to at least 10;

reacting the base and the parent zeolite thereby obtaining said alkaline-treated mesoporous zeolite; and separating the alkaline-treated mesoporous zeolite.

2. The method according to claim 1, further comprising that the alkaline-treated mesoporous zeolite features a magnesium content in the range of 0.3 wt % to 5 wt %.

3. The method according to claim 1, wherein the magnesium dispersion is at least 50% as measured with oxalic acid chemisorption.

4. The method according to claim 1, wherein said alkaline treatment consists of:

a) the steps of claim 1 and b) performing a subsequent acid treatment, or performing a subsequent ion exchange treatment, or performing a subsequent acid treatment followed by an ion exchange treatment.

5. The method according to claim 1, wherein the hydrocarbon feedstock is selected from the group consisting of:

wax, hydrowax, diesel, lube oil, base oil, vegetable oil, Fischer-Tropsch derived oil, and any combination thereof.

6. The method according to claim 1, wherein the method reduces diesel and/or lube losses to less than 0.2% per degree Celsius of Cloud Point improvement.

7. The method according to claim 1, wherein the dewaxing conditions comprise a temperature in the range of 200° C. to 450° C.

8. The method according to claim 1, wherein the dewaxing conditions comprise a hydrogen partial pressure in the range of 15 bar to 350 bar.

9. The method according to claim 1, wherein the dewaxing conditions comprise a hydrogen treat gas rate in the range of 100 Nl/l to 1000 Nl/l.

10. The method according to claim 1, wherein the catalyst consists of between 10 and 80 wt % of a binder, the alkaline-treated mesoporous zeolite, and the between 300 ppm and 2 wt % of platinum or palladium; and wherein the binder is a metal oxide support, wherein the metal oxide support is one or more selected from the group consisting of:

alumina, silica, silica-alumina, magnesium oxide, and titania.

11. The method according to claim 1, wherein the alkaline-treated zeolite has the framework topology of MTT.

12. The method according to claim 1, wherein the alkaline treatment is executed gradually.

13. The method according to claim 1, wherein the alkaline treatment is executed by flowing an alkaline solution through a stationary membrane containing the parent zeolite.

14. The method according to claim 1, wherein the preparation of the alkaline-treated mesoporous zeolite using an alkaline treatment at a pH>10 comprises the steps of:

providing a suspension of a parent zeolite in an aqueous solution, wherein the aqueous solution has a pH of at most 8 and comprises at least a magnesium salt;

adding a base to the suspension, thereby forming a reaction mixture, wherein the pH of the aqueous solution is increased to at least 10;

reacting the base and the parent zeolite in the suspension, thereby obtaining said alkaline-treated mesoporous zeolite; and separating the alkaline-treated mesoporous zeolite from the suspension.

15. The method according to claim 1, wherein the preparation of the catalyst further comprises the step of:

performing an ion exchange treatment on the alkaline-treated mesoporous zeolite; and/or performing a calcination treatment on the alkaline-treated mesoporous zeolite; and/or shaping the alkaline-treated mesoporous zeolite into a macroscopic shaped catalyst particle.

16. A dewaxing catalyst comprising an alkaline-treated mesoporous zeolite with the MTT framework topology and at least 300 ppm of Pt or Pd, wherein the alkaline-treated mesoporous zeolite further comprises a molar Si/Al ratio of at least 20, a mesopore volume in the range of 0.4 to 1.2 ml/g, an external surface in the range of 100 to 350 m$^2$/g, a Brønsted acidity as measured using pyridine of at least 50 μmol/g, and a magnesium content in the range of 0.3 wt % to 10wt %.

17. An alkaline-treated mesoporous zeolite with the MTT framework topology, wherein the alkaline-treated mesoporous zeolite further comprises a molar Si/Al ratio of at least 20, a mesopore volume in the range of 0.4 to 1.2 ml/g. an external surface in the range of 100 to 350 m$^2$/g, a Brønsted acidity as measured using pyridine of at least 50 μmol/g, and a magnesium content in the range of 0.3 wt % to 10 wt %.

\* \* \* \* \*